(12) United States Patent
Zbinden et al.

(10) Patent No.: US 9,690,056 B2
(45) Date of Patent: Jun. 27, 2017

(54) CONNECTOR ASSEMBLY

(71) Applicant: Samtec, Inc., New Albany, IN (US)

(72) Inventors: Eric Zbinden, New Albany, IN (US);
John Allen Mongold, Todd, PA (US)

(73) Assignee: SAMTEC, INC., New Albany, IN (US)

( * ) Notice: Subject to any disclaimer, the term of this patent is extended or adjusted under 35 U.S.C. 154(b) by 42 days.

(21) Appl. No.: 14/749,570

(22) Filed: Jun. 24, 2015

(65) Prior Publication Data

US 2015/0378116 A1 Dec. 31, 2015

Related U.S. Application Data

(60) Provisional application No. 62/016,755, filed on Jun. 25, 2014.

(51) Int. Cl.
*G02B 6/36* (2006.01)
*G02B 6/38* (2006.01)
*G02B 6/42* (2006.01)

(52) U.S. Cl.
CPC ......... *G02B 6/3879* (2013.01); *G02B 6/4249* (2013.01); *G02B 6/4292* (2013.01); *G02B 6/3897* (2013.01); *G02B 6/4269* (2013.01)

(58) Field of Classification Search
None
See application file for complete search history.

(56) References Cited

U.S. PATENT DOCUMENTS

| | | | |
|---|---|---|---|
| 4,776,806 A | 10/1988 | Adams | |
| 4,966,556 A * | 10/1990 | Reymond | H01R 12/58 29/882 |
| 5,176,538 A * | 1/1993 | Hansell, III | H01R 13/65802 439/607.23 |
| 5,689,598 A | 11/1997 | Dean, Jr. et al. | |
| 6,099,684 A | 8/2000 | Dannoux | |
| 6,315,593 B1 | 11/2001 | Bentley et al. | |
| 6,386,767 B1 | 5/2002 | Naghski | |
| 6,412,986 B1 | 7/2002 | Ngo et al. | |
| 7,223,119 B2 | 5/2007 | Droesbeke | |
| 8,036,500 B2 | 10/2011 | McColloch | |
| 8,814,445 B2 | 8/2014 | Gallegos et al. | |
| 8,830,679 B2 | 9/2014 | Scholeno | |

(Continued)

FOREIGN PATENT DOCUMENTS

| | | |
|---|---|---|
| JP | 2003-324824 A | 11/2003 |
| JP | 4279965 B2 | 6/2009 |
| JP | 5439882 B2 | 3/2014 |

OTHER PUBLICATIONS

Official Communication issued in Application PCT/US2015/037539, mailed on Oct. 8, 2015.

(Continued)

*Primary Examiner* — Mike Stahl

(74) *Attorney, Agent, or Firm* — Keating & Bennett, LLP

(57) ABSTRACT

A system includes a substrate including a first row of first receptacles, a cradle including an opening and a spring member, connectors located within the opening, and cables connected to the connectors. The cradle is configured to connect each of the connectors simultaneously or nearly simultaneously to a corresponding first receptacle, and the spring member pushes on the connectors with a force greater than an insertion force of the first receptacle.

16 Claims, 30 Drawing Sheets

(56) References Cited

U.S. PATENT DOCUMENTS

| | | |
|---|---|---|
| 8,845,206 B2 | 9/2014 | Chan et al. |
| 8,985,862 B2 | 3/2015 | Cote et al. |
| 2002/0111067 A1 | 8/2002 | Sakurai et al. |
| 2005/0018973 A1* | 1/2005 | Loder .................. G02B 6/3849 385/53 |
| 2013/0051733 A1 | 2/2013 | Gallegos et al. |
| 2014/0270762 A1 | 9/2014 | Li et al. |

OTHER PUBLICATIONS

SFF Committee, "SFF-8644 Specification for Mini Multilane 12 Gb/s 8/4X Shielded Connector (HD12sh)", Rev. 3.4; Sep. 22, 2014, pp. 1-9.

Yazaki, "LC Connector Product Specification, Section 1: Connectors", Version 1.2; Jul. 2007; 11 pages.

\* cited by examiner

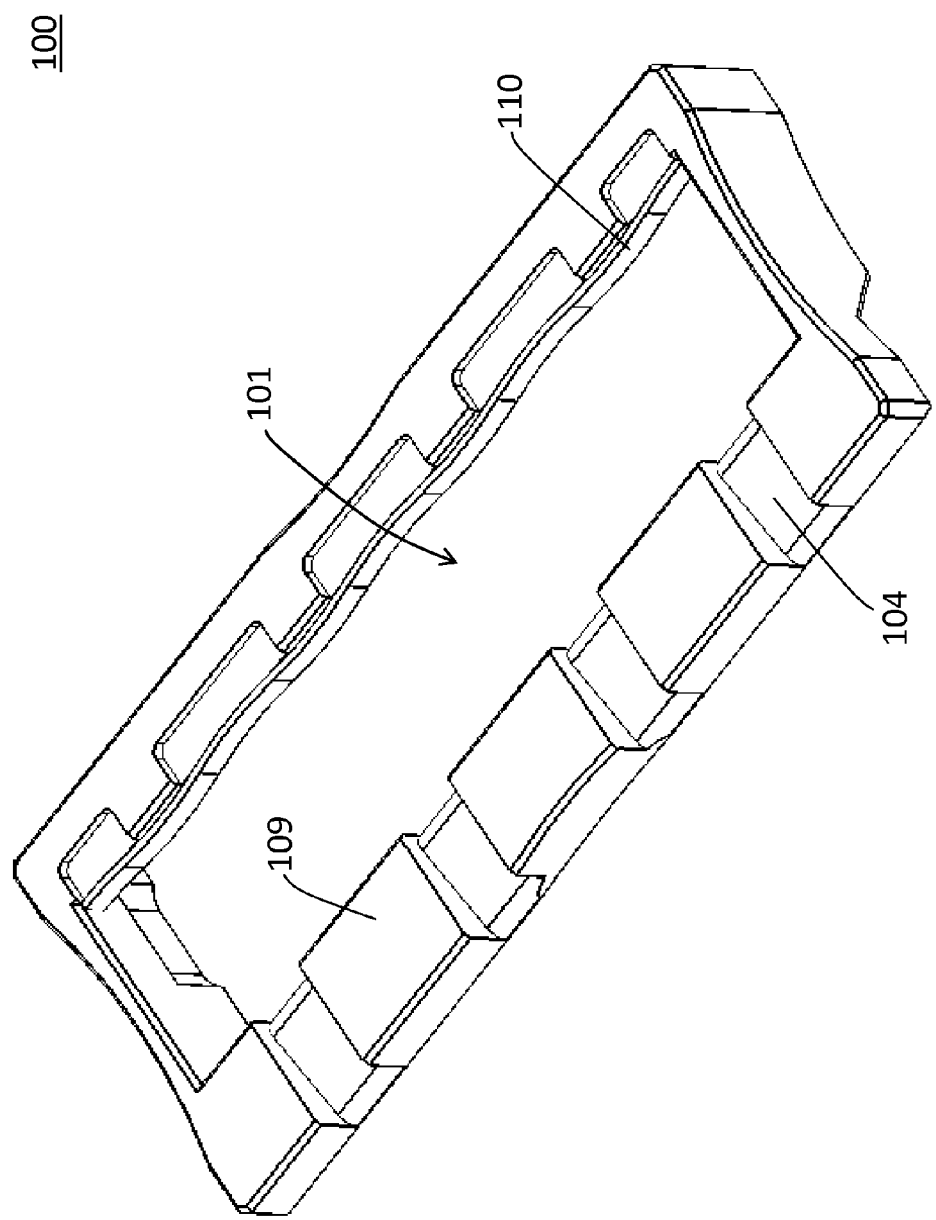

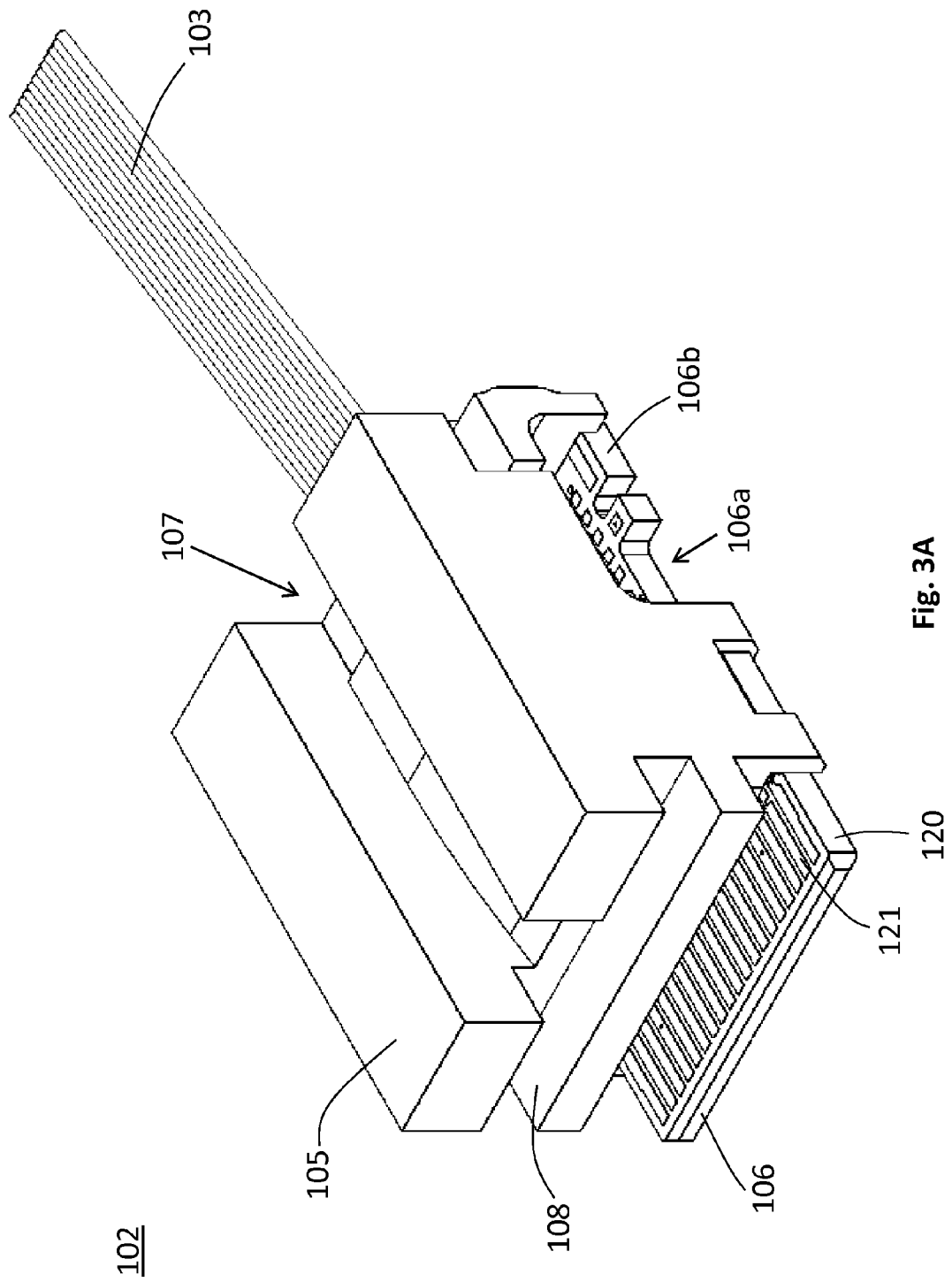

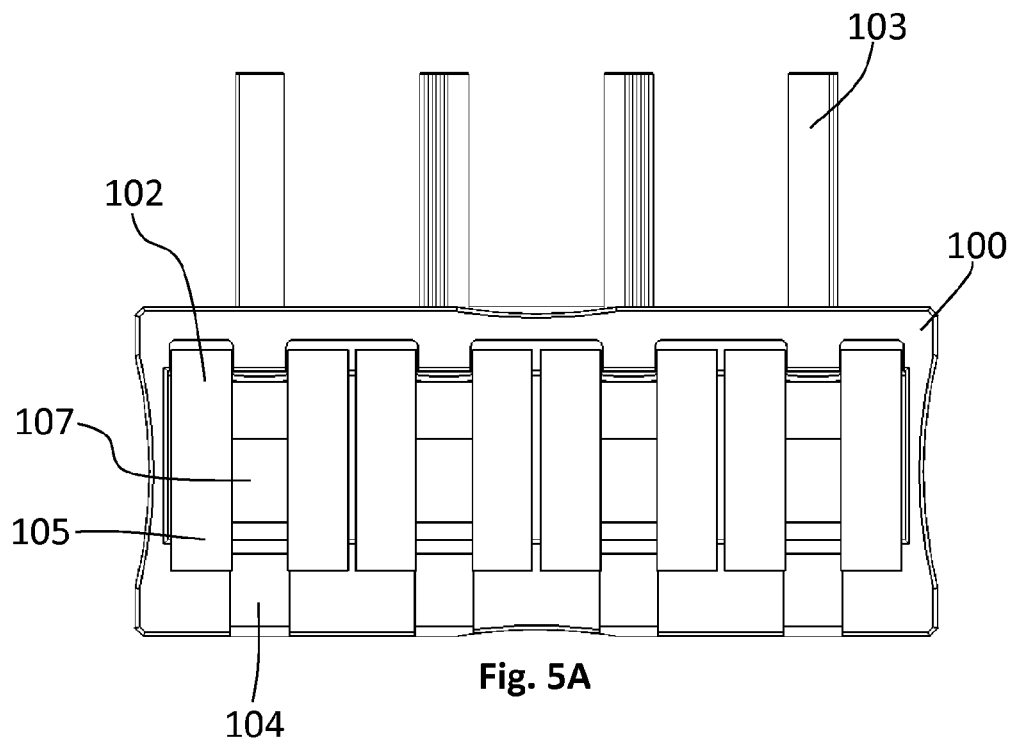
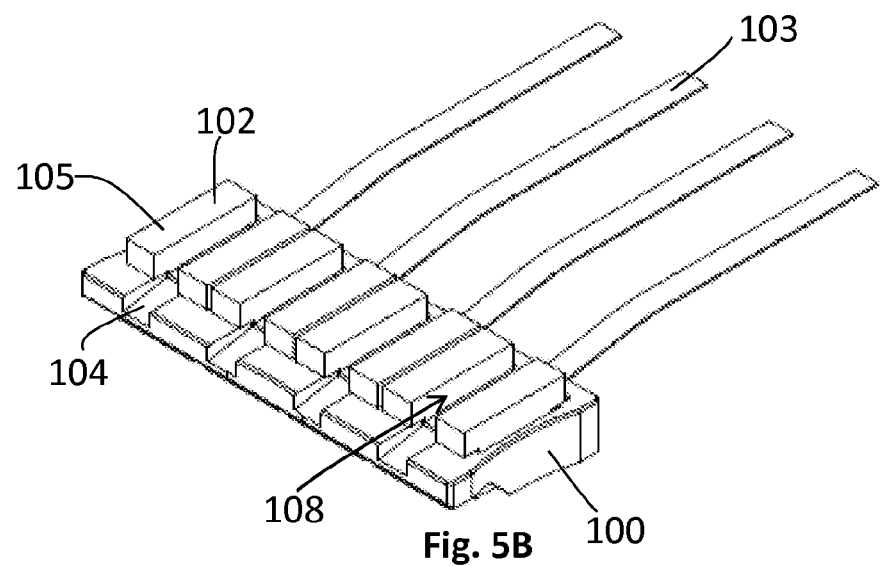
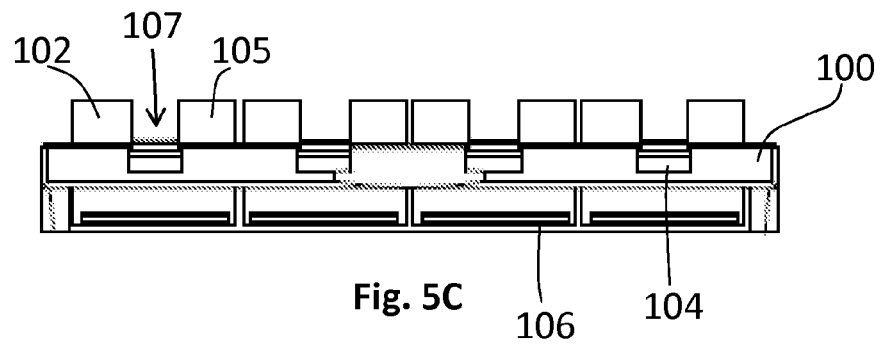

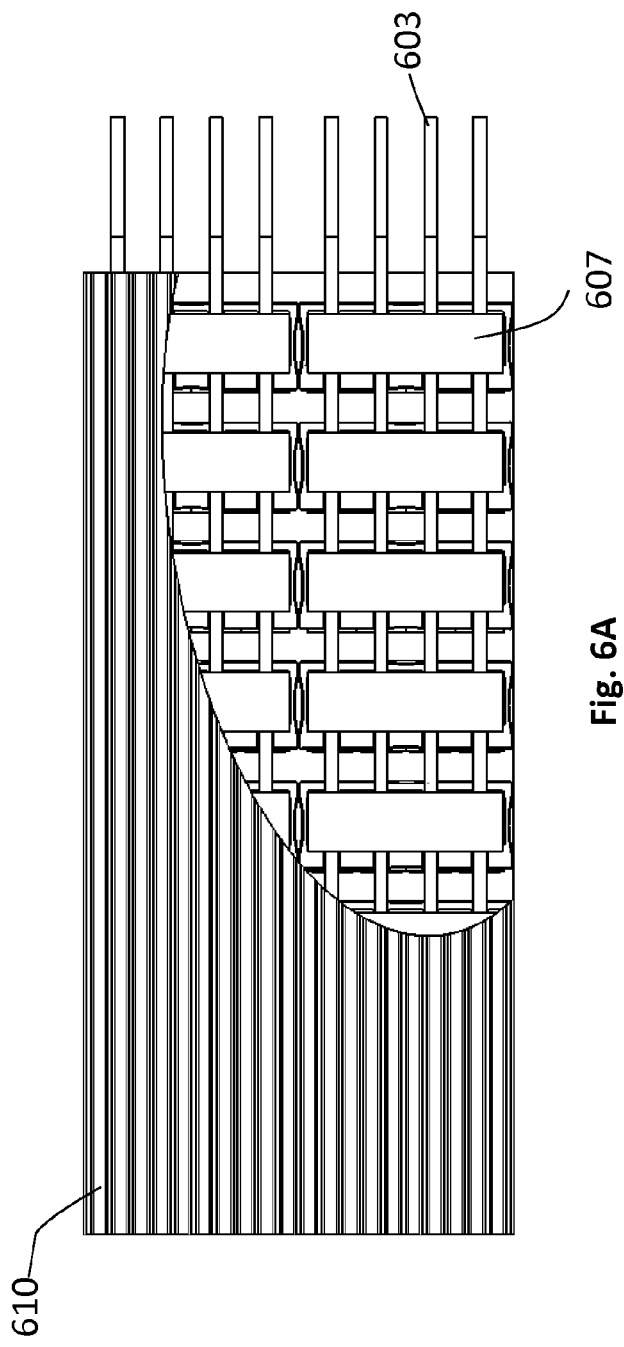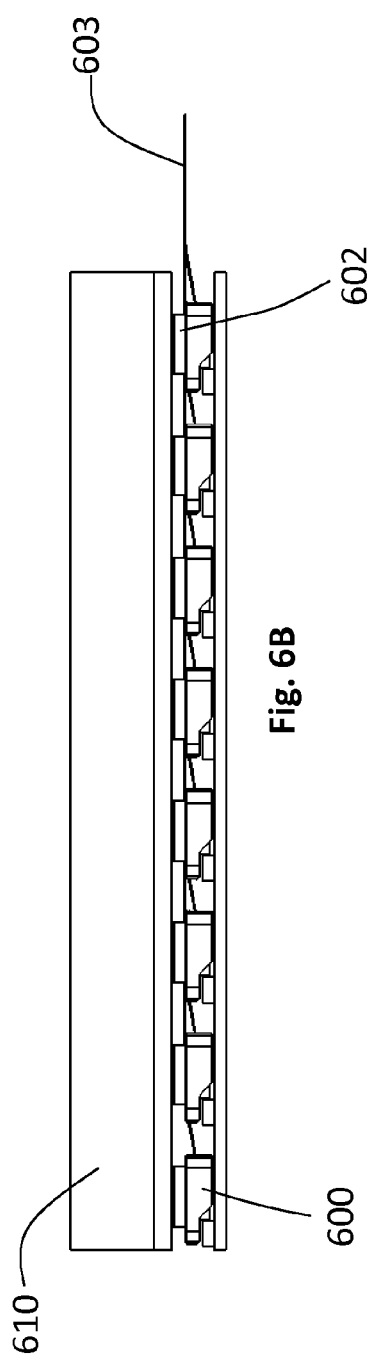

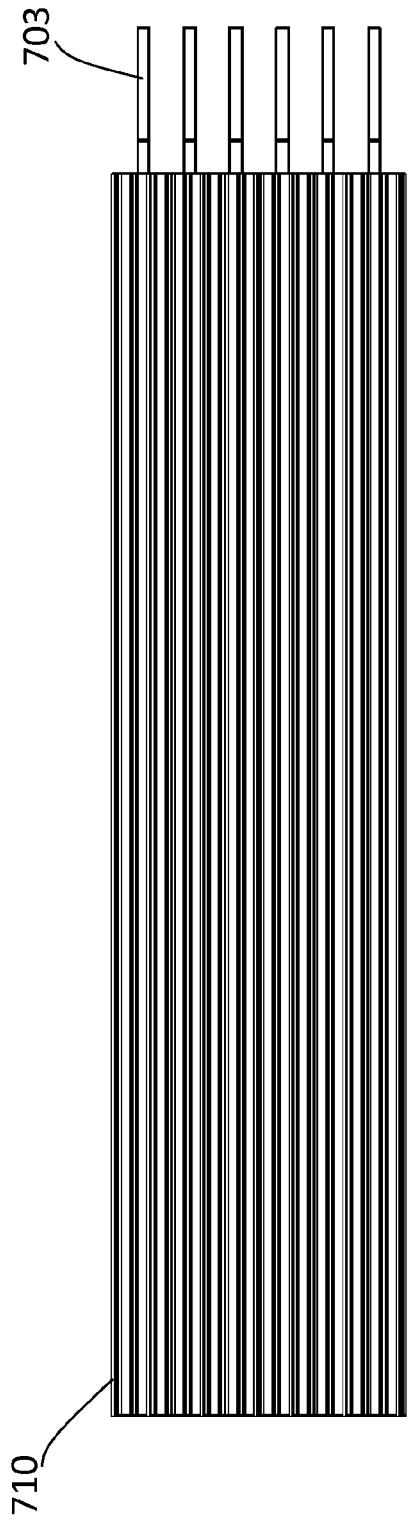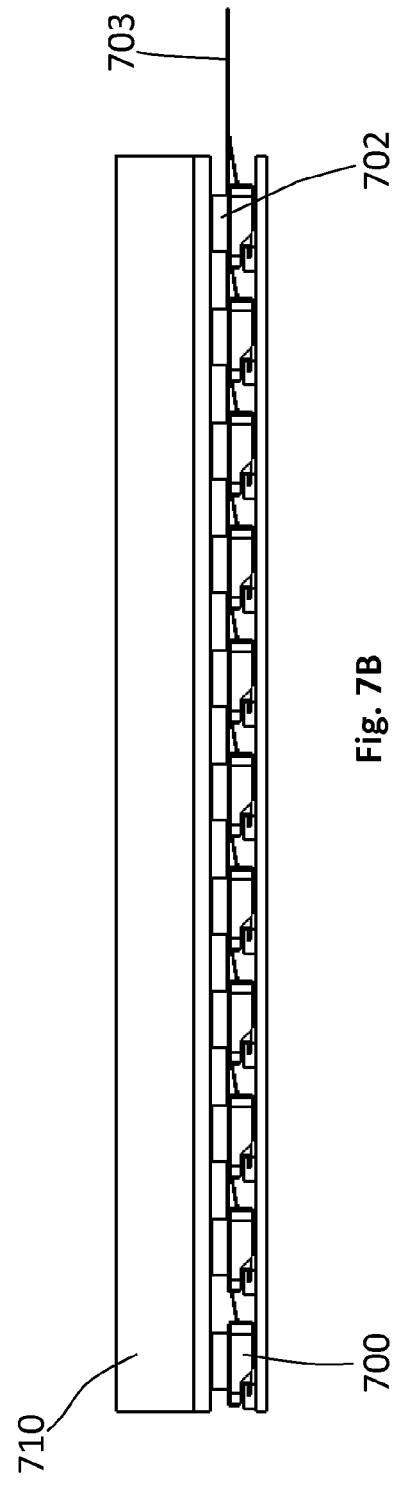
Fig. 7A
Fig. 7B

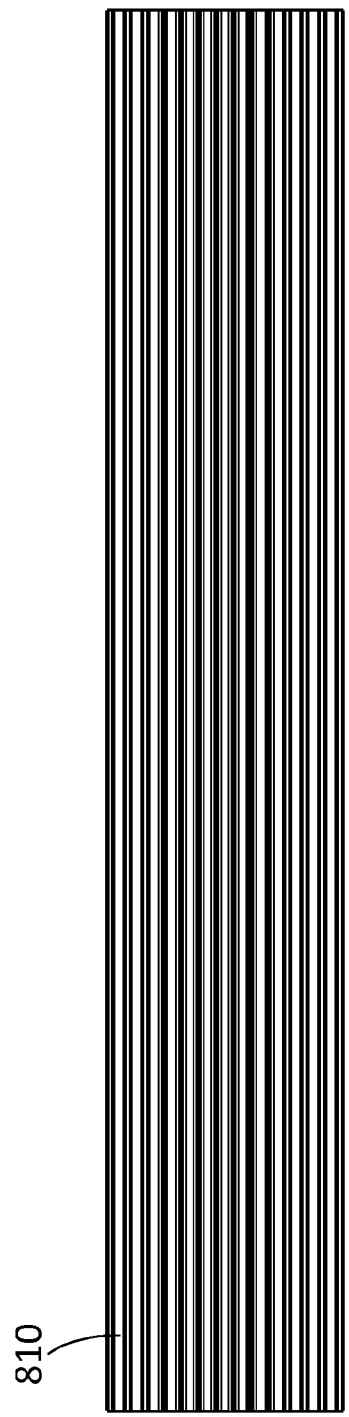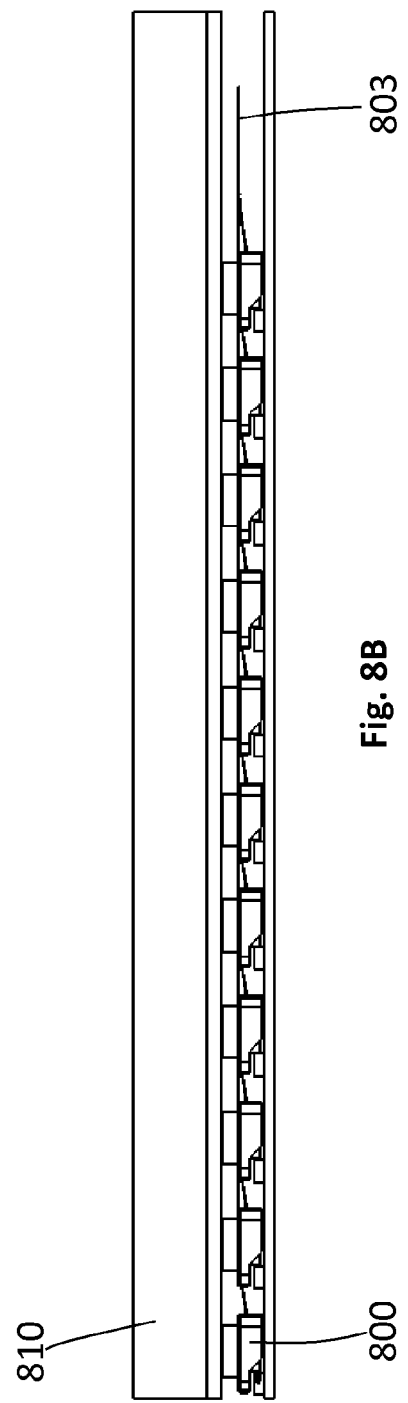

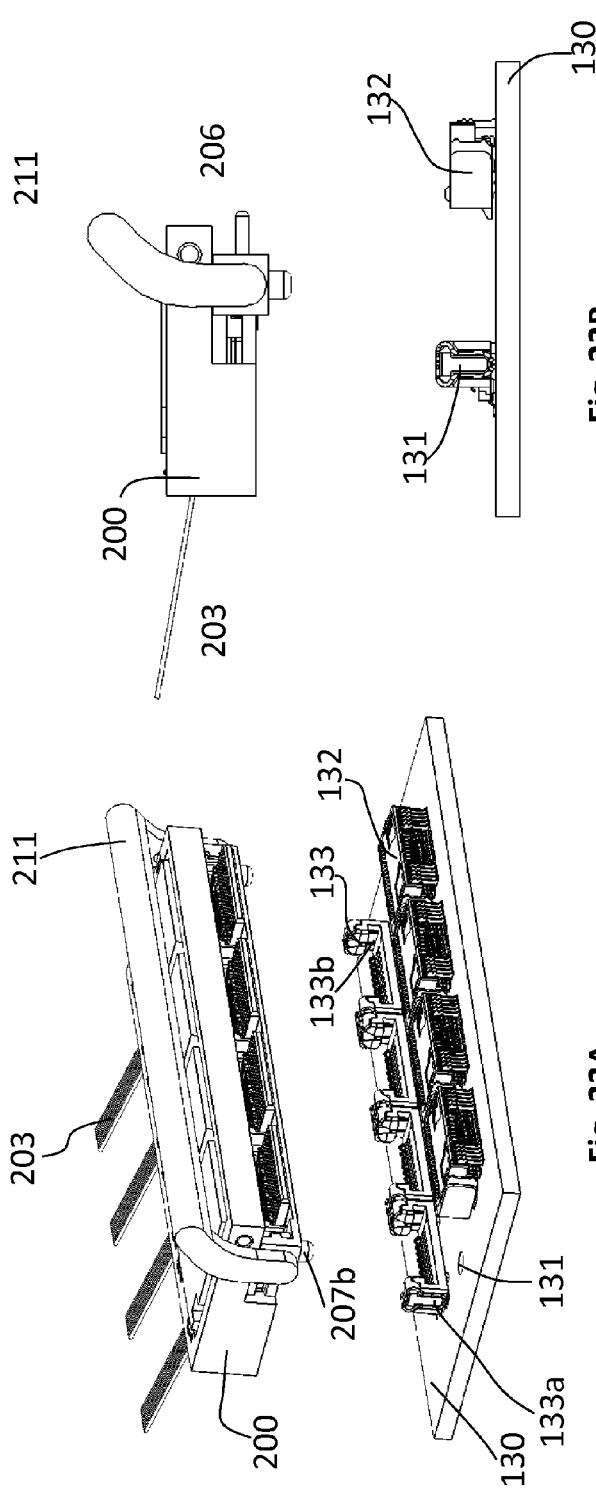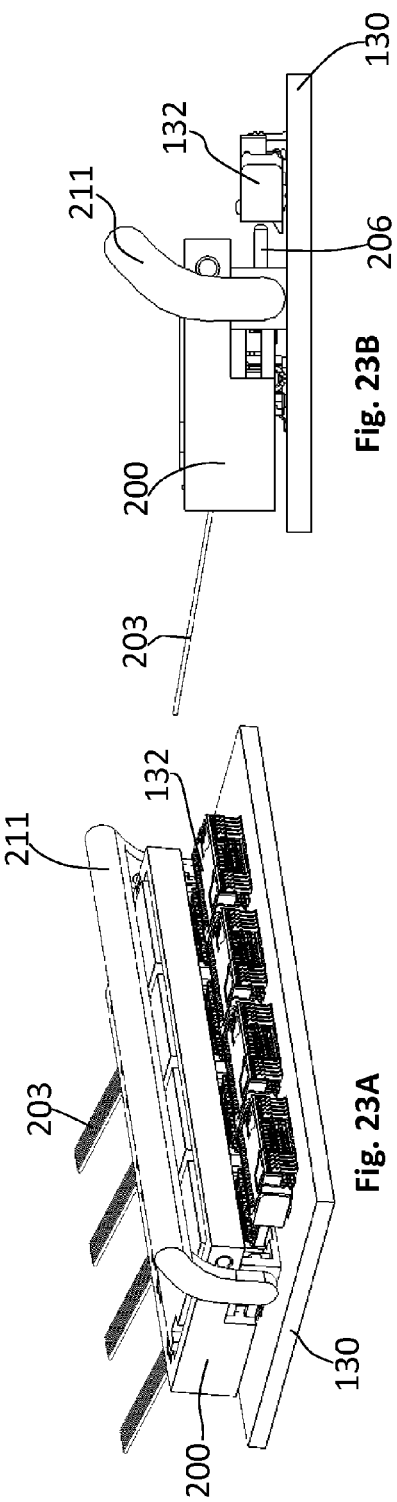

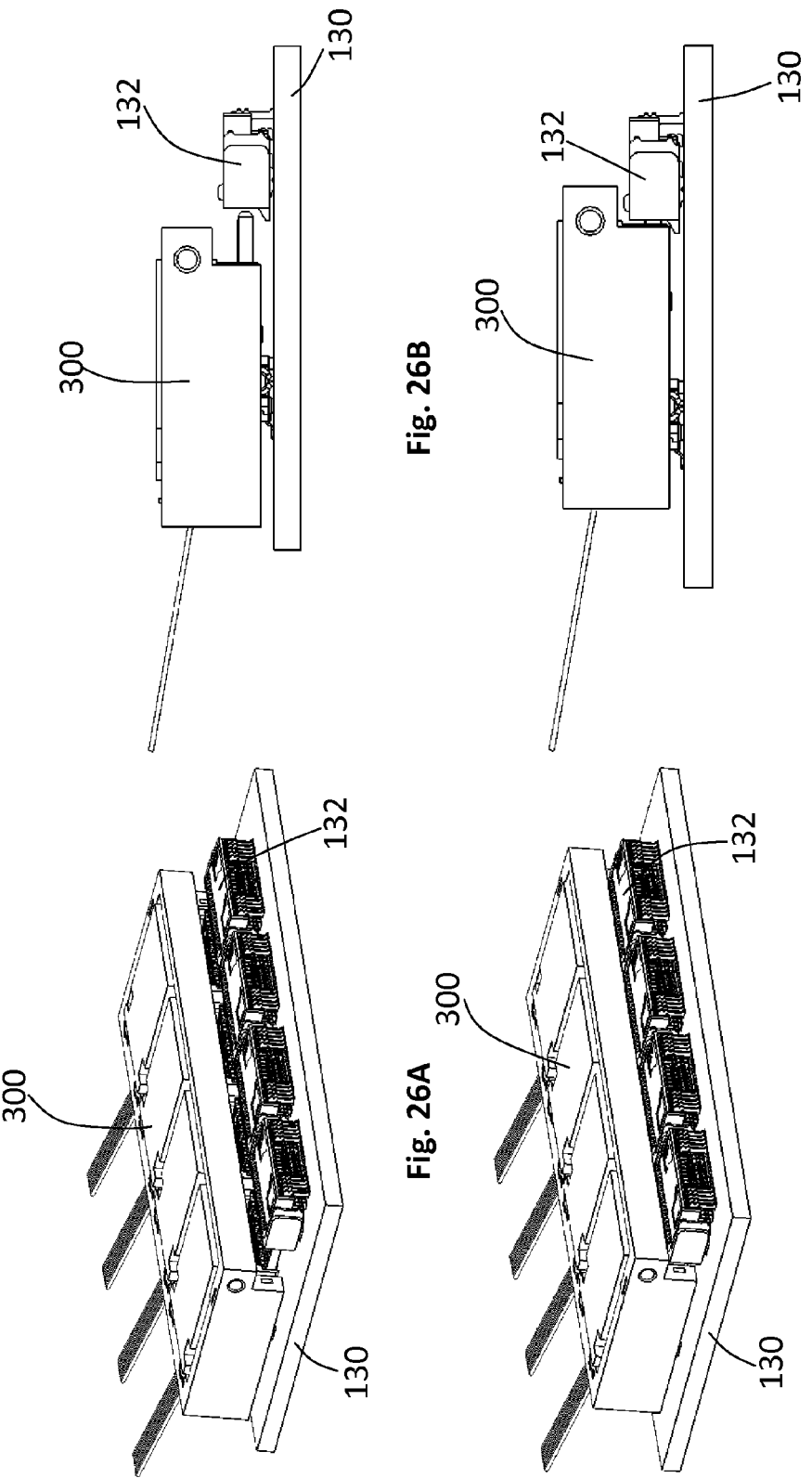

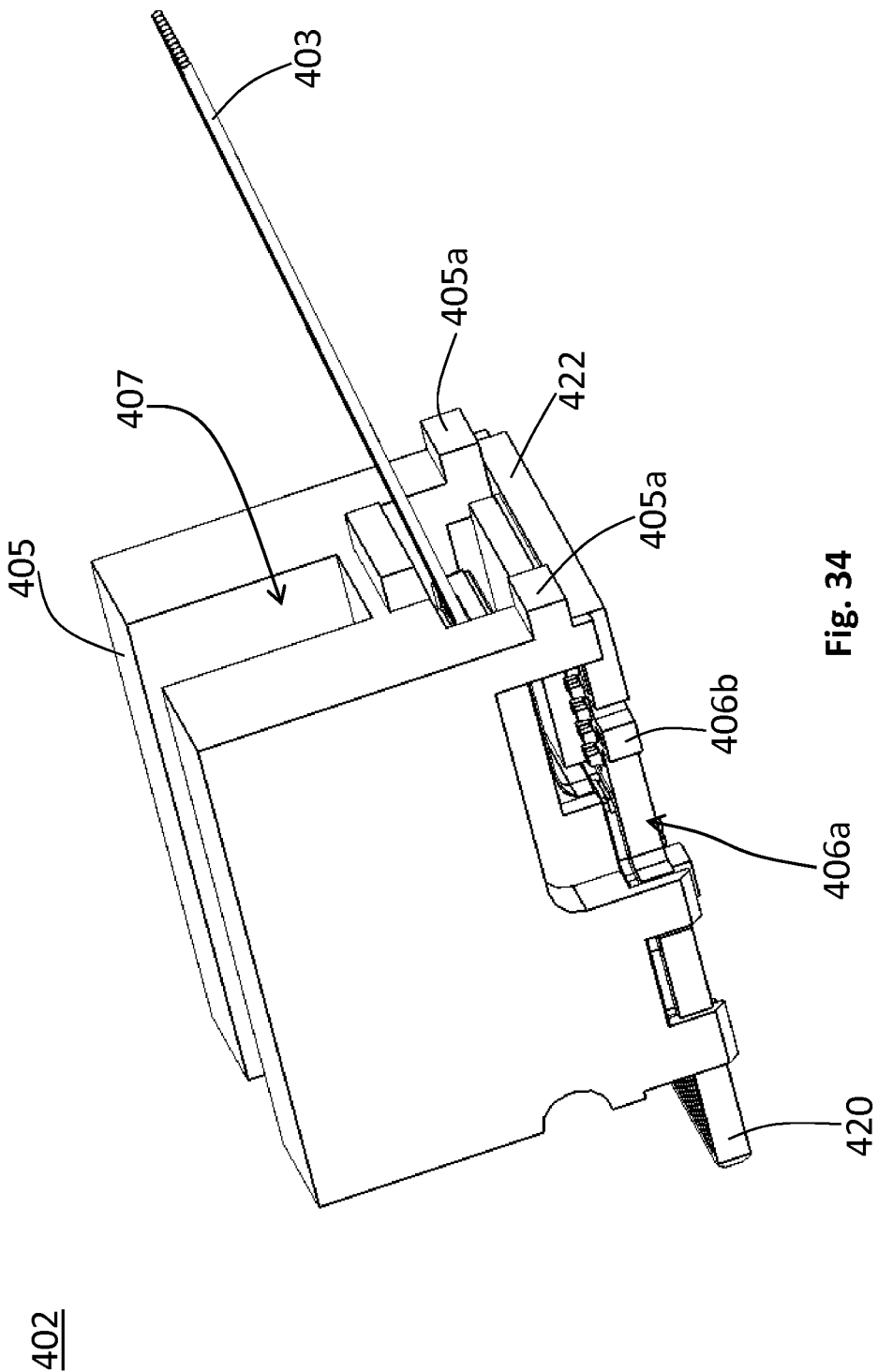

CONNECTOR ASSEMBLY

CROSS-REFERENCE TO RELATED APPLICATIONS

1. Field of the Invention

This application claims the benefit of U.S. Provisional Application No. 62/016,755 filed Jun. 25, 2014, which is hereby incorporated by reference in its entirety.

BACKGROUND OF THE INVENTION

1. Field of the Invention

The present invention relates to connectors, including optical transceivers. More specifically, the present invention relates to a cradle for holding a plurality of connectors.

2. Description of the Related Art

Equipment installations using interconnects with very high channel counts have a need for one or more integrated subsystems with large numbers of optical links (e.g., 48, 96 up to 800, etc. links) per module, instead of having to make separate connections or making connections with a few channels at a time. A channel is a single path used to transmit and/or receive signals. A channel can include, for example, an optical fiber and the electrical path(s) connected to the optical fiber that are used to transmit and/or receive signals. Additionally, many equipment installations also use a clear path to a 28 Gbps line rate, which precludes the use of a connection architecture having multiple connectors in the RF path.

A conventional solution to the issue of increasing channel count in interconnects involved increasing the line count in a single connector through the use of a quad small form-factor pluggable (QSFP) transceiver as compact transceivers to connect network devices to cables. Another solution involves the CXP copper connector system that provides up to twelve channels suitable for ethernet. Additionally, conventional solutions included the Mini Serial-Attached Small-Computer-System-Interface (SCSI) High-Density (Mini-SAS HD) board connectors and cable assemblies, which include x1, x2, and x4 connector assemblies.

Increasing the number of optical channels in a single subsystem by mounting multiple optical engines or other connector types on a single printed circuit board (PCB) or substrate (e.g., PCIEOx8, etc.) makes manufacturing difficult as the yield per channel is required to be maintained at a very high level to have a reasonable overall yield. For example, a 48-channel module with a channel yield of 99% has approximately a 50% overall yield. It is thus desirable to have components with a limited number of channels, for example, 12, and provide some type of structure or way to readily connect a plurality of these components to a PCB or some other substrate.

SUMMARY OF THE INVENTION

To overcome the problems described above, preferred embodiments of the present invention provide a cradle that can hold two or more connectors, that can simultaneously seat many channels, and that can increase the system yield.

A preferred embodiment of the present application includes a system including a substrate including a first row of first receptacles, a cradle including an opening and a spring member, connectors located within the opening, and cables connected to the connectors. The cradle is configured to connect each of the connectors simultaneously or nearly simultaneously to a corresponding first receptacle, and the spring member pushes on the connectors with a force greater than an insertion force of the first receptacle.

The cables are preferably optical fibers. The system further preferably includes a lever configured to move a portion of the cradle to cause each of the connectors to simultaneously or nearly simultaneously be connected to the corresponding first receptacles. The lever preferably extends along an edge of the cradle or from the opening. There are preferably three or more connectors within the cradle. The first row of first receptacles is preferably located in a middle of the substrate. The connectors are preferably located side-by-side or end-to-end.

Preferably, the substrate further includes a second row of second receptacles, and the cradle is configured to connect each of the connectors simultaneously or nearly simultaneously to a corresponding second receptacle. The second receptacles are preferably positive latch connectors.

Preferably, the cradle includes grooves corresponding to each of the connectors; each of the connectors includes a groove; and each of the grooves in the cradle is aligned with a groove in a corresponding connector.

The first receptacles are preferably edge-card connectors. The system further preferably includes a rod inserted through holes in the cradle to secure the connectors in the cradle. The cradle preferably includes a base with pins that engage with holes in the substrate. Preferably, each of the connectors includes a groove configured to secure each of the connectors in the cradle.

A connector assembly array according to a preferred embodiment of the present invention includes a substrate including a first row and a second row of first receptacles, a first cradle including first connectors and first cables attached to corresponding first connectors, and a second cradle including second connectors and second cables attached to corresponding second connectors. The first connectors are connected to the first row of first receptacles. The second connectors are connected to the second row of first receptacles. Each of the first connectors includes a groove. The first and second cradles are arranged on the substrate such that each of the second cables extends through a corresponding groove in the first connectors.

The connector assembly array further preferably includes a first and a second row of second receptacles. Preferably, the first connectors are also connected to the first row of second receptacles, and the second connectors are connected to the second row of second receptacles.

The connector assembly array further preferably includes a heatsink covering and attached to the first and second connectors.

A connector assembly according to a preferred embodiment of the present invention includes a cradle including an opening and cable-receiving grooves arranged along an edge of the cradle, and connectors including cable-receiving grooves and arranged adjacent to each other such that each of the cable-receiving grooves of the cradle is aligned with a corresponding cable-receiving groove of the connectors.

A system according to a preferred embodiment of the present invention includes a substrate including a first row of first mid-board receptacles, a cradle including an opening, connectors located within the opening, and cables connected to the connectors. The cradle is configured to connect each of the connectors simultaneously or nearly simultaneously to a corresponding first mid-board receptacle.

Preferably, each of the first mid-board receptacles includes an opening that does not face a nearest edge of the substrate.

The system further preferably includes a second row of second mid-board receptacles, and the cradle is preferably configured to connect each of the connectors simultaneously or nearly simultaneously to both the corresponding first mid-board receptacle and to a corresponding second mid-board receptacles.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

FIG. 2 is a front perspective view of the cradle according to a first preferred embodiment of the present invention.

FIGS. 3A and 3B are front and rear perspective views of a connector that can be used with the cradle shown in FIG. 2.

FIG. 5A is a top view of a connector assembly according to the first preferred embodiment of the present invention.

FIG. 5B is a front perspective view of the connector assembly shown in FIG. 5A.

FIG. 5C is a front view of the connector assembly shown in FIG. 5A.

FIG. 6A is a top cutaway view of an array of connector assemblies according to a second preferred embodiment of the present invention.

FIG. 6B is a side view of the array shown in FIG. 6A.

FIG. 7A is a top view of an array of connector assemblies according to a third preferred embodiment of the present invention.

FIG. 7B is a side view of the array shown in FIG. 7A.

FIG. 8A is a top view of an array of connector assemblies according to a fourth preferred embodiment of the present invention.

FIG. 8B is a side view of the array shown in FIG. 8A.

FIGS. 22A-24B are perspective and side views of the connector assembly shown in FIG. 19 being seated.

FIGS. 25A-27B are perspective and side views of a connector assembly according to a sixth preferred embodiment of the present invention being seated.

FIGS. 33 and 34 are front and rear perspective views of a connector that can be used with various preferred embodiments of the present invention.

DETAILED DESCRIPTION OF PREFERRED EMBODIMENTS

A preferred embodiment of the present invention provides a connector assembly that includes a cradle that has an opening. The opening is configured to receive and hold two or more connectors. The cradle holds and positions the connectors such that the connectors are adjacent to each other and such that the connectors can be simultaneously, or nearly simultaneously within manufacturing tolerances, seated with corresponding connectors on a substrate.

For clarity, the connectors on the substrate will be referred to as receptacles to differentiate the connectors on the substrate from the connectors in the cradle. In this application, simultaneously or nearly simultaneously seating of the connectors with the receptacles means that the connectors are each seated with a corresponding receptacle in a single motion. Because the connectors and receptacles can have slight variations from manufacturing tolerances, the connectors can be seated with a corresponding receptacle at slightly different times, but all of the connectors will be fully seated or connected with the corresponding receptacles at the end of the single seating motion.

Each connector is preferably connected to two different receptacles. For example, the connector can be connected to both a receptacle for high-speed signals and a receptacle for low-speed signals and/or power. The cradle allows each connector to self-align relative to the receptacles on the substrate. The substrate is typically a PCB, but other suitable materials could also be used. The cradle is modular in that it can hold different connectors or modules that can be replaced if one fails. Being modular allows the cradle to increase system yield.

The connectors can be optical transceivers, such as those disclosed in, for example, U.S. application Ser. Nos. 13/539,173, 13/758,464, 13/895,571, 13/950,628, and 14/295,367, the entire contents of which are hereby incorporated by reference. The connectors can also be electrical connectors, i.e., non-optical connectors. As a specific example, the connector can be a FireFly™ optical transceiver, from Samtec, Inc. of New Albany, Ind.

Figure 1:
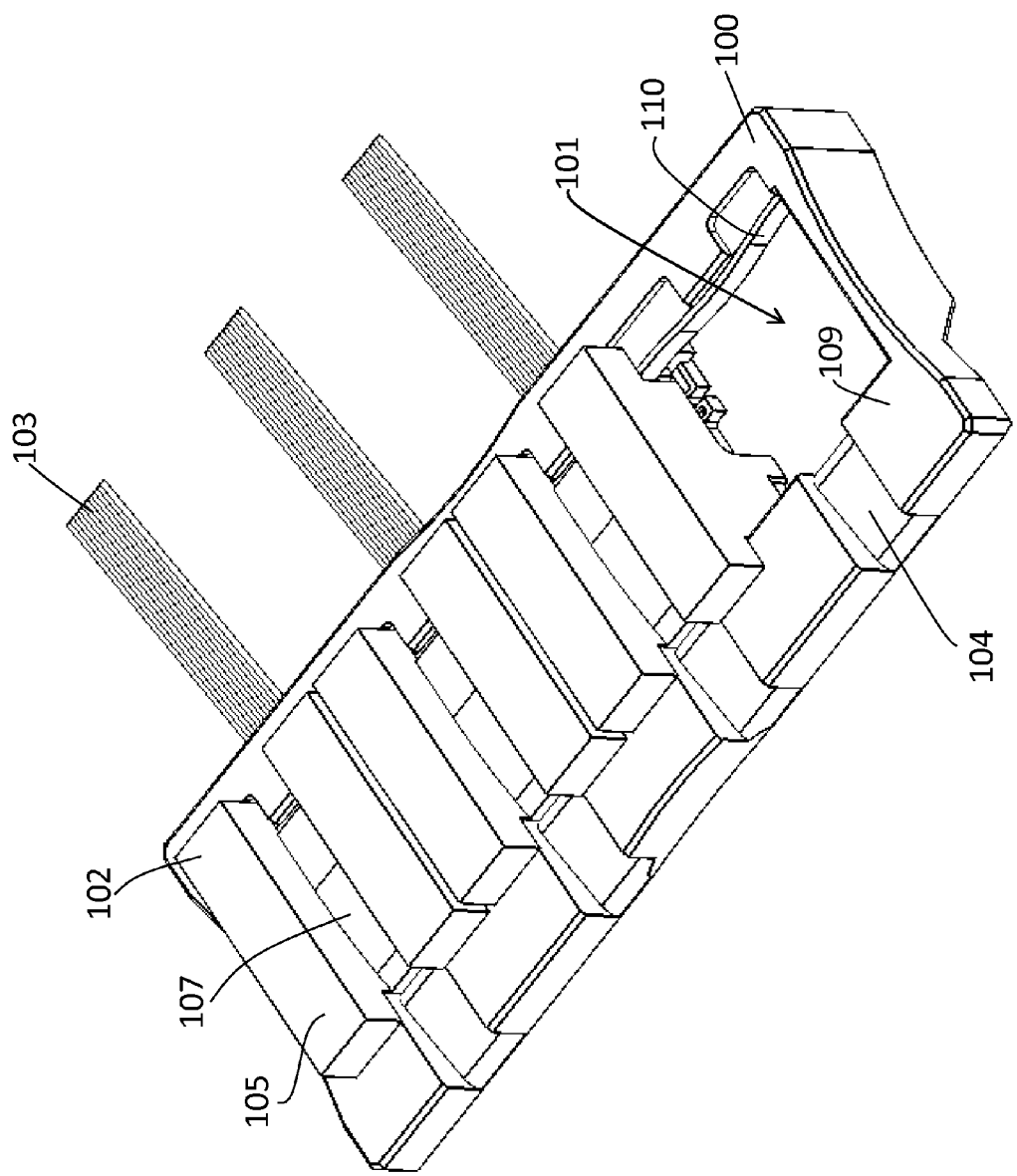
FIG. 1 is a front perspective view of a connector assembly according to a first preferred embodiment of the present invention.

FIGS. 1-5C show the first preferred embodiment of the present invention. The connector assembly shown in FIG. 1 includes a cradle 100. The cradle 100 is a generally rectangular component with an opening 101 in the middle. The cradle 100 is preferably a monolithic component but could be made from any number of components. The cradle 100 can be made using metal or polymer injection molding, sheet metal forming, machining, or other suitable materials and methods, for example. FIG. 1 shows the cradle 100 with three connectors 102 and one empty slot. FIGS. 5A-5C show the cradle 100 with four connectors 102 and no empty slots.

A spring 110 is located along one edge of the opening 101. The spring can be made of any suitable elastic material, including but not limited to carbon steel alloy, stainless steel, beryllium copper alloy, inconel alloy, monel alloy, and phosphor bronze alloy, for example. The spring 110 is a variable-force device that can accommodate dimensional tolerances between different connectors 102 and between the connectors 102 and the cradle 100. Spring 110 in FIGS. 1 and 2 is a single spring, but a different spring or springs could be provided for each connector 102. The spring 110 pushes the connectors 102 against the cradle 100 to secure the connectors 102 in the cradle. The connectors 102 are not rigidly held in place in the cradle 100 so that the connectors 102 can float in the x-, y-, and z-directions in the cradle 100. The spring 110 pushes the connector 102 such that the groove 108 of the connector 102 (shown in FIG. 3A) is engaged with the ledge 109 of the cradle 100. Preferably, the springs 110 push the connectors 102 in the same direction as the insertion direction of the first receptacle 132 shown in FIG. 10 and with a force greater than the insertion force of the first receptacle 132, where the insertion force of the first receptacle 132 is the force required to fully mate a connector 102 with the first receptacle 132. Pushing in the insertion direction allows the spring 110 to accommodate variances in the connectors 102 and the first receptacles in the insertion direction of the first receptacles 132.

Figure 10:
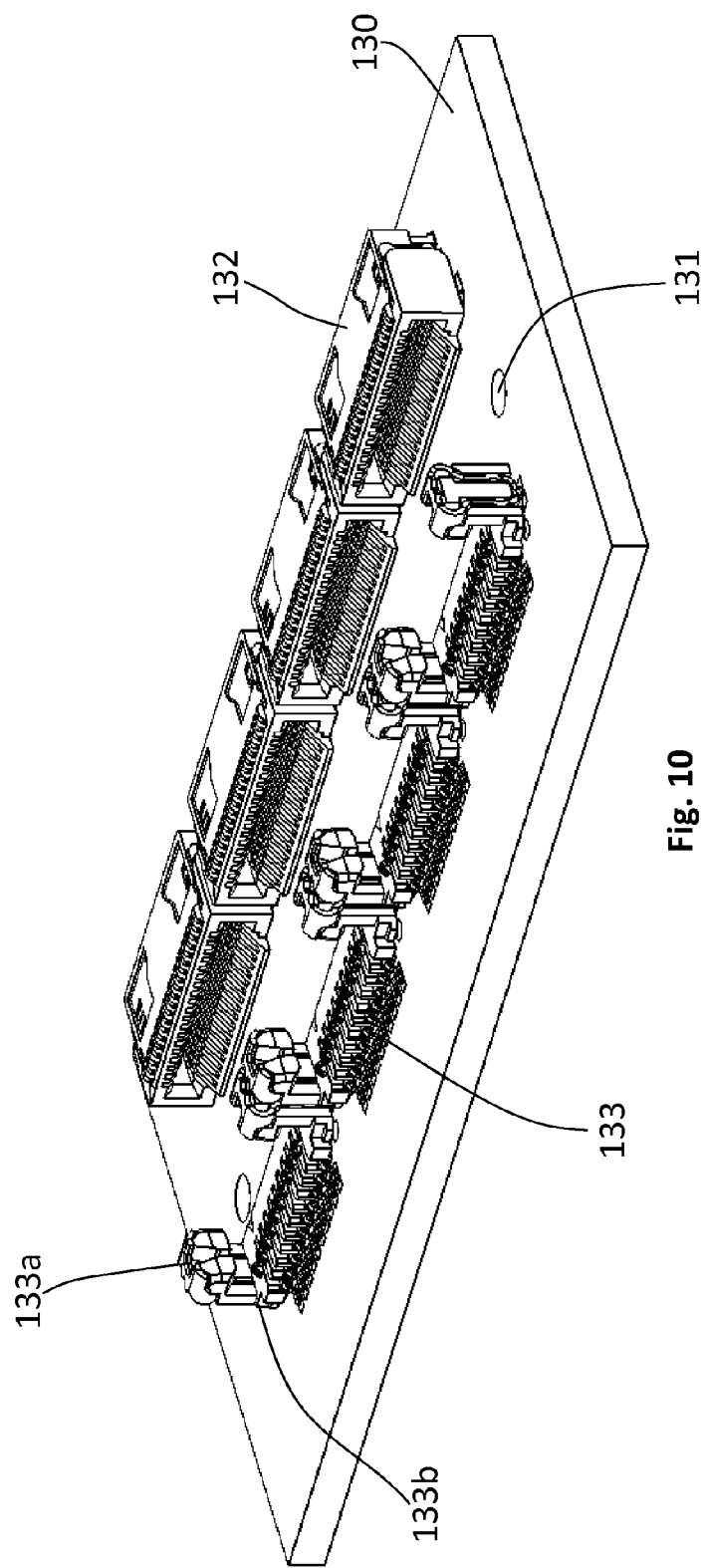

The first receptacles 132 shown in FIG. 10 preferably include chamfers around their openings that increase the insertion tolerances by helping guide the board 106 into the openings. Increasing the insertion tolerances of the first receptacles 102 makes it easier for the connectors 102 to self-align. By accommodating variances in the x-, y-, and z-dimensions by floating the connectors 102 in the cradle 100 and by using the chamfers and the springs 110, the cradle 100 does not need to be precisely aligned because each connector 102 can self-align relative to the first and second receptacles 132, 133 shown in FIG. 10. The spring 110 is configured to reduce or eliminate undue stress on the connectors 102 as the cradle 100 is used to connect the connectors 102 with the first and second receptacles 132, 133.

As an example of the spring 110 accommodating variances in the insertion direction, a first connector 102 might have a shorter exterior dimension than an adjacent second connector 102. The spring 110 allows the second connector 102 to properly connect with corresponding first and second receptacle 132, 133 while the cradle 100 continues to apply a forward force on the shorter first connector 102 until the first connector 102 properly connects with the corresponding first and second receptacle 132, 133.

In FIG. 1, the opening 101 in the cradle 100 accommodates four connectors 102; however, it is possible for the cradle 100 to accommodate fewer than four or more than four connectors 102. In FIG. 1, the cradle 100 includes one row of four connectors 102 arranged side-by-side, i.e., 1×4 array; however, the four connectors 102 (or any number of connectors 102) could be arranged end-to-end in a 4×1 array. In a 4×1 array, there would be four separate springs that each push a corresponding connector 102. Cradle 100 can also include more than one row of connectors. For example, the cradle can be arranged as a 2×4 array. Cradles 100 can also be connected together to form a larger array. For example, two 1×4 arrays can be connected to form either a 2×4 array or a 1×8 array. Although not shown in FIGS. 1 and 2, the cradle 100 can include thin-walled dividers between adjacent connectors 102. The dividers can increase the rigidity of the cradle 100, which might be desirable in a larger array.

Figure 4:
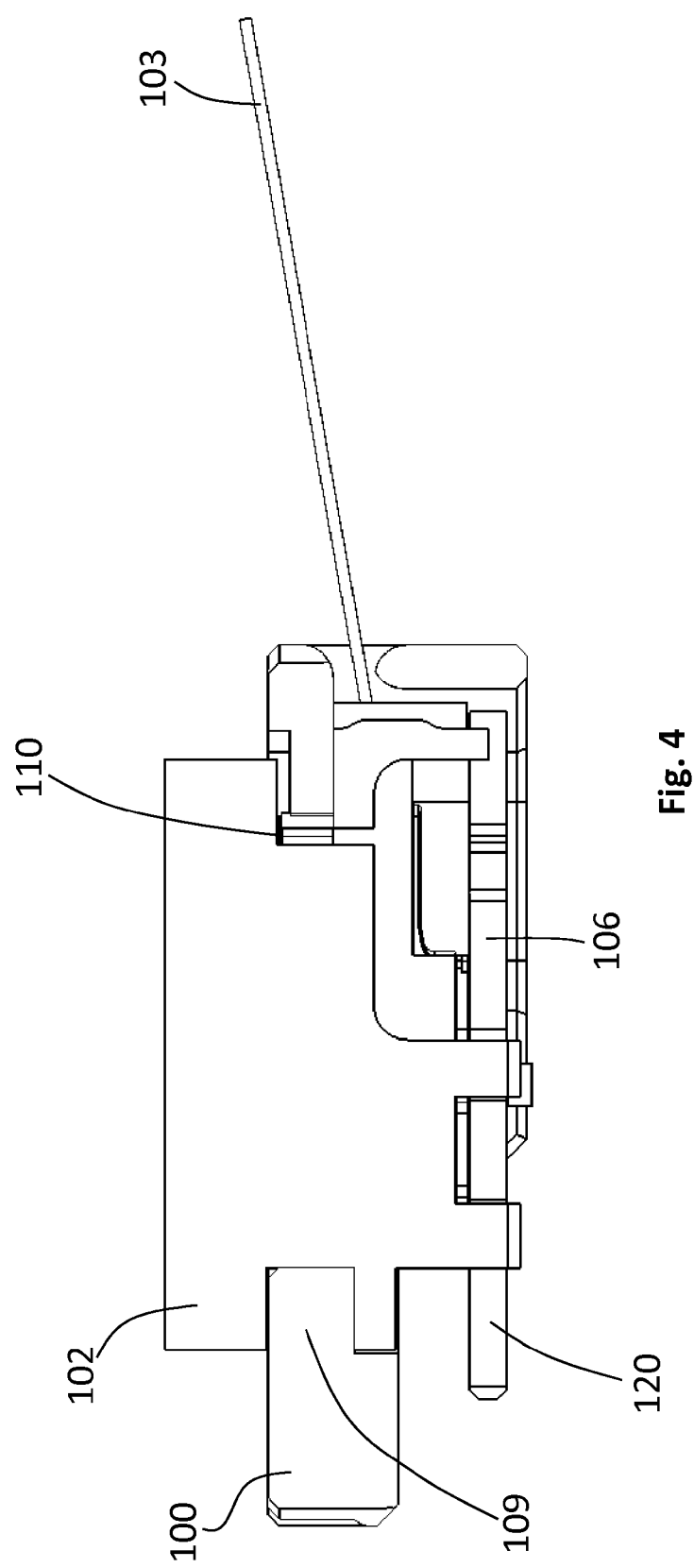
FIG. 4 is a side view of a connector that can be used with the cradle shown in FIG. 2.

The cradle 100 includes a ledge 109 that engages with the groove 108 in the connector 102 as shown in FIG. 4. The cradle 100, the opening 101, the ledge 109, and the spring 110 are configured to enable the connectors 102 to be aligned to accommodate the tolerances of the receptacles (shown in FIG. 10 as first and second receptacles 132, 133) to which the connectors 102 will be connected. The cradle 100 is preferably designed to allow for the cooling of the connectors 102.

The cradle 102 also includes grooves 104. The number of grooves 104 preferably matches the number of connectors 102. The grooves 104 are arranged to receive cables 103 from adjacent cradles 100 as seen, for example, in FIGS. 6A-8C. FIGS. 6A-8C show the second, third, and fourth preferred embodiments of the present invention that includes the connector assemblies such as those shown in FIGS. 1-5C arranged in different arrays. The grooves 104 preferably are aligned with the grooves 107 in the heatsink 105 of the connectors 102 so that the cables 103 from the adjacent cradles 100 can extend along the groove 104 in the cradle 100 and the groove 107 in the heatsink 105, which helps with cable management.

Figure 3B:
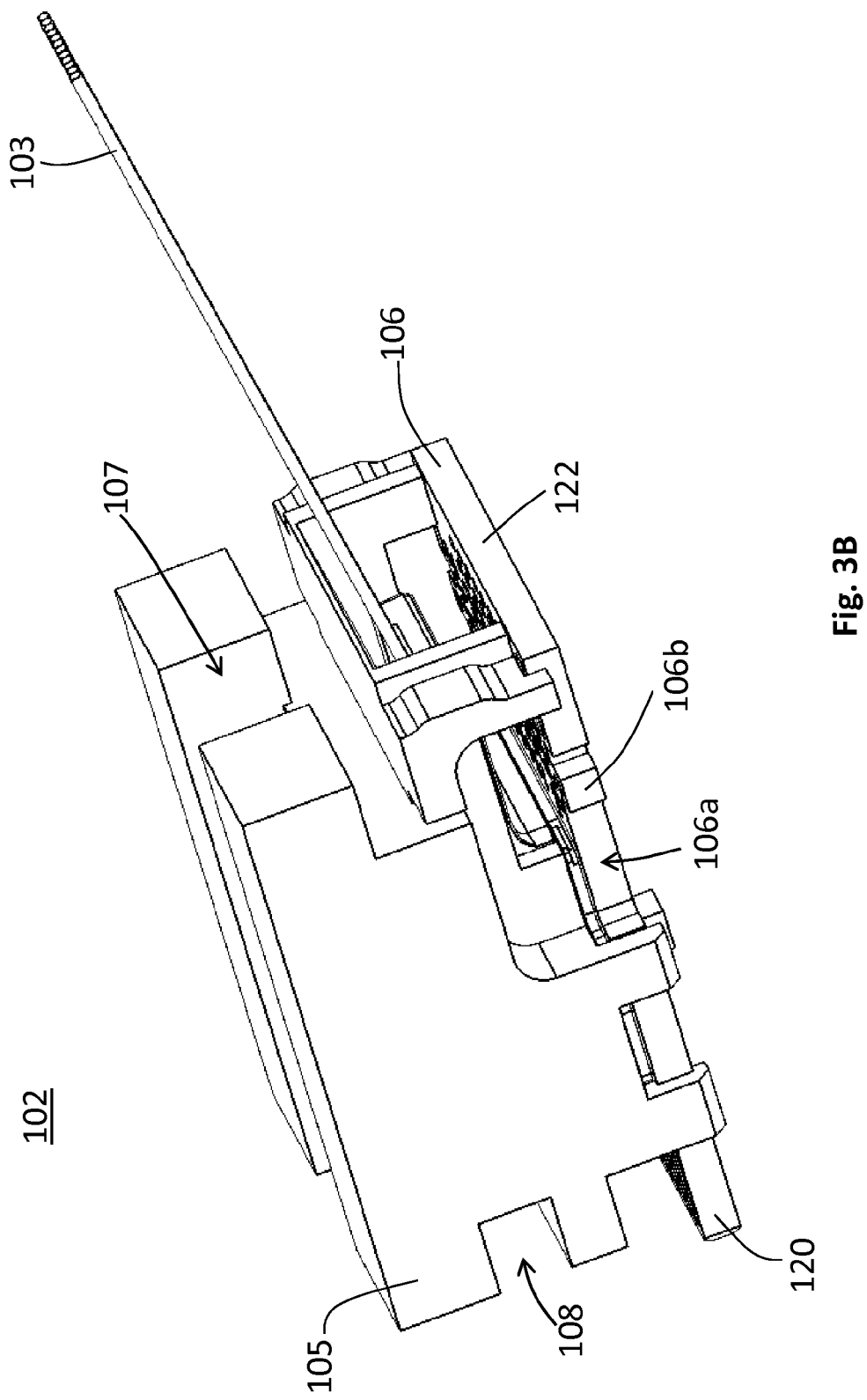

FIGS. 3A and 3B show the connector 102. Each connector 102 is connected to a cable 103. Preferably, each cable 103 is a ribbon of optical fibers; however, the cable 103 could be individual optical fibers. If the connector 102 is not an optical connector, then the cable 103 could be a ribbon of electrical wire or individual wires. Any number of optical fibers or electrical wires can be used. If the connector 102 is a FireFly™ optical transceiver, then the cable 103 is a ribbon of twelve optical fibers. A cradle 100 with four FireFly™ optical transceivers provides 48 channels (=12 channels per FireFly™ optical transceivers×4 FireFly™ optical transceivers). A channel is one path that transmits or receives signals and includes the optical fiber and the electrical path(s) connected to the optical fiber.

Figure 21:
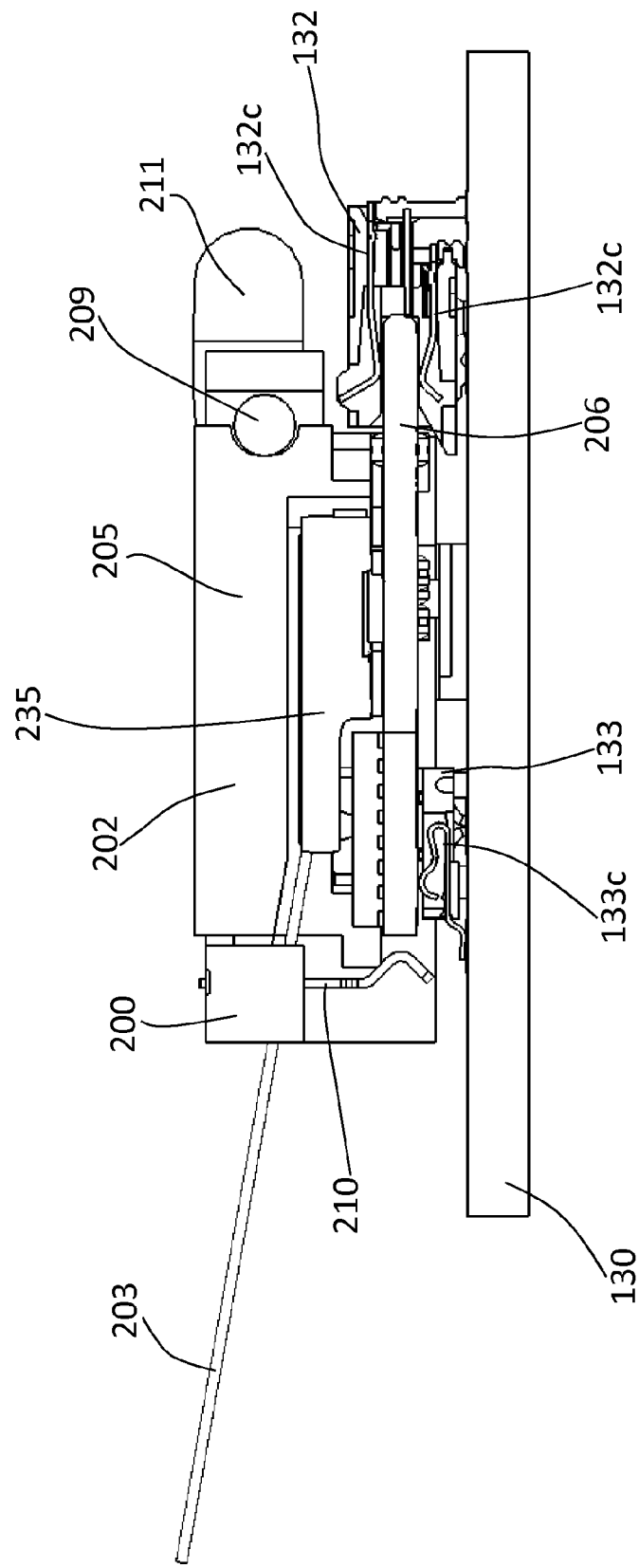
FIG. 21 is a side sectional view of the connector assembly shown in FIG. 19.

The connectors 102 preferably include a heatsink 105 attached to a board 106. The board 106 preferably includes components for electrical-to-optical conversion, optical-to-electrical conversion, or both. An example of such components is the optical engine 235 shown in FIG. 21 of the fifth preferred embodiment. The connector 102 of the first preferred embodiment is similar to the connector 202 of the fifth preferred embodiment. If the connector 102 is not an optical connector, then the board 106 can have electronic components for processing any signals transmitted through the connector. The board 106 includes an end 120 with pads 121 that are arranged to be inserted into a first receptacle 132 as shown, for example, in FIG. 10 to create an electrical connection with the contacts in the first receptacle 132 as shown in FIG. 21 for the fifth preferred embodiment. The pads 121 can be located on the top and the bottom of the board 106. The other end 122 of the board 106 preferably includes pads (not shown) on the bottom of the board 106 that can create an electrical connection with contacts in a second receptacle 133 as shown in FIG. 21 for the fifth preferred embodiment.

The heatsink 105 is preferably attached to the board 106 by arms on the heatsink 105. However, it is possible to attach the heatsink 105 to the board 106 in any suitable manner. The heatsink 105 preferably includes grooves 107 and 108. Groove 107 is located on the top of the heatsink 105 and extends in the same direction as the insertion direction of the connector 102. Groove 108 is on the front of the heatsink 105 and arranged to engage with the ledge 109 when inserted into the cradle 100. Although the groove 108 and the ledge 109 have a rectangular shape, it is possible to use other shapes such as triangular or circular. In some applications a heatsink 105 might not be necessary. In those applications, the heatsink 105 can be replaced with, for example, a plastic housing that can include grooves 107, 108.

Figure 9:
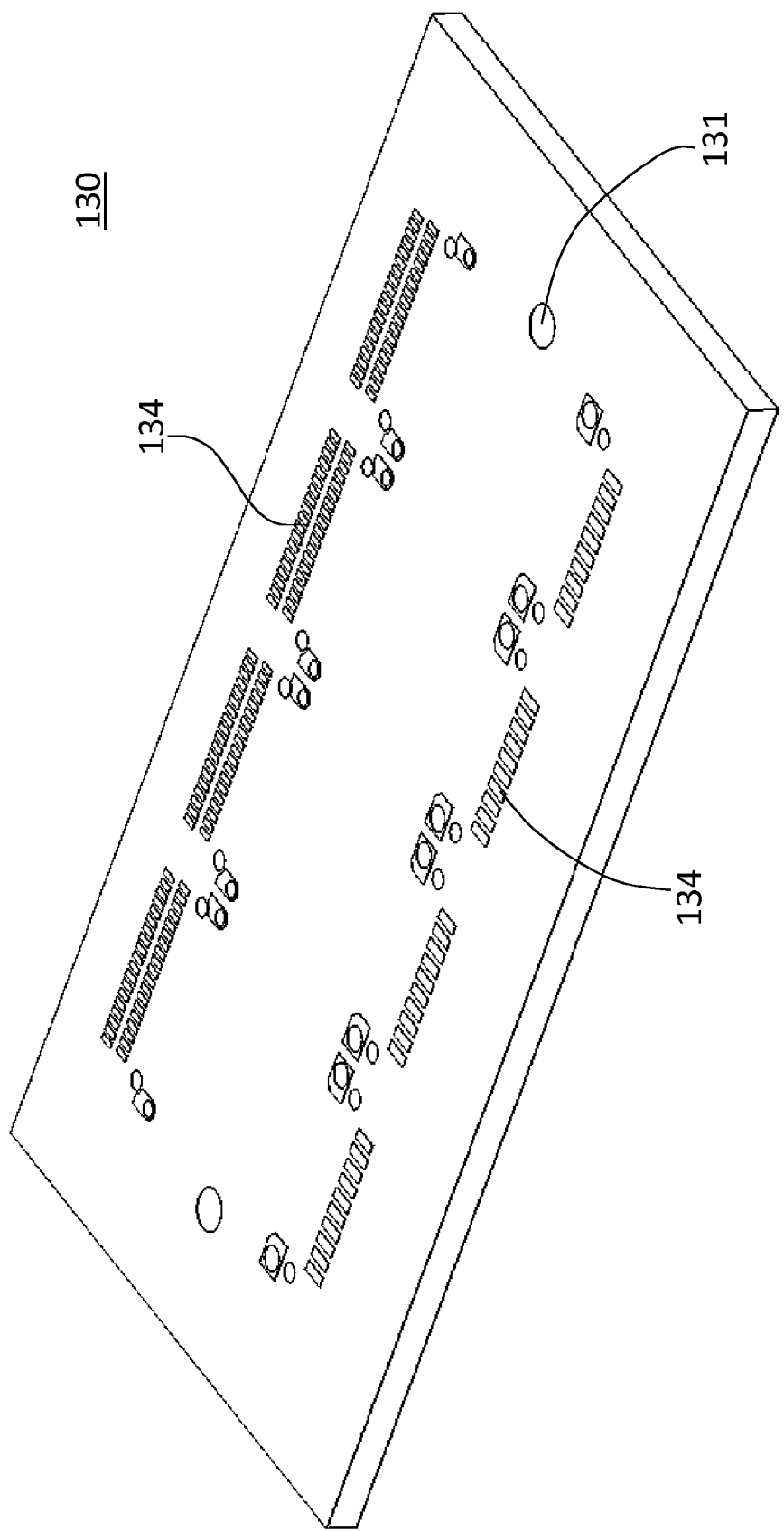
FIGS. 9 and 10 are front perspective views of a substrate that can be used with various preferred embodiments of the present invention.

FIGS. 9 and 10 show a substrate 130 that can be used with the first preferred embodiment of the present invention. The substrate 130 can also be used as well with various other preferred embodiments of the present invention. As shown in FIG. 9, the substrate 130 includes pads 134 that can provide electrical connection between the vias or traces in the substrate 130 and the contacts in the first and second receptacles 132, 133. In FIG. 10, the substrate 130 preferably includes first and second receptacles 132, 133 arranged in rows. It is also possible to include only a row of first receptacles. Specific examples of the preferred embodiment of the present invention use FireFly™ optical transceivers, which are meant to be connected to two receptacles. However, if the connector that is used is meant to be used with a single connector, then the substrate 130 would include a row of first receptacles. It is possible to provide a row with three receptacles if the connectors are meant to be connected to three receptacles. For example, one first receptacle and two second receptacles could be used.

The first and second receptacle 132, 133 are attached to the substrate 130 by any suitable method. The substrate 130 in FIG. 10 includes a row of four first receptacles and a row of four second receptacles. The number of first and second receptacles 132, 133 can vary and will typically match the number of connectors 102. Preferably, the first and second receptacles 132, 133 are different types of connectors. The first and second receptacles can be mid-board connectors that are located in the middle of the substrate 130 and that do not need to be located near or on the edge of the substrate 130. In FIG. 10, the substrate is so small that the middle of the substrate 130 is near the edge of the substrate. However, for example, FIGS. 6A-6D show that the openings of the first and second receptacles 632, 633 do not have to be pointed at the nearest edge of the substrate.

The first receptacle 132 can be an edgecard connector for high-speed signals, and the second receptacle 133 can be a positive latching connector for low-speed signals and power. Positive latching connectors typically include a mechanism that secures a mated connector to the positive latching connectors. The first receptacle 132 preferably includes chamfers to help guide the board 106 into the opening of the first receptacles, which makes it easier for the connectors 102 to self-align. The second receptacle 133 preferably includes positive latching to help secure the connectors 102 to the substrate 130; however, it is possible to use a second receptacle 133 without positive latching and to provide external latching as shown in FIGS. 22A-24B and FIGS. 28-31. As specific examples, the first receptacle 132 can be a UEC5 socket from Samtec, Inc. of New Albany, Ind., and the second receptacle 133 can be a UCC8 receptacle from Samtec, Inc. of New Albany, Ind. The UEC5 socket can transmit high-speed signals, e.g. up to 28 Gbps. The UCC8 receptacle provides mechanical support as well as low-speed signals and/or power.

The board 106 preferably includes a notch 106a. The connector 102 is loaded by fitting the notch 106a over the pillars 133a of the second receptacle 133. The connector 102 is seated by then sliding the connector 102 forward such that a portion 106b of the board 106 is inserted into the slot 133b of the second receptacle 133 and such that the end 120 of the board 106 is inserted into the first receptacle 132.

The connector assemblies are provided by loading the connectors 102 into the cradle 100. The connectors 102 can be all of one type, i.e., all optical or all electrical, or can be of different types, i.e., both optical and electrical. Each connector 102 is preferably tested before being loaded into the cradle 100. By testing each connector 102 before being loaded into the cradle 100, the yield of the connector assemblies can be increased. The connector assembly can be sold as a high-channel unit that allows multiple connectors 102 to be seated simultaneously or nearly simultaneously. The purchaser or user of the connector assembly should not have to dissemble the purchased connector assembly because the connectors 102 were tested before being loaded into the cradle 100.

Figure 6C:
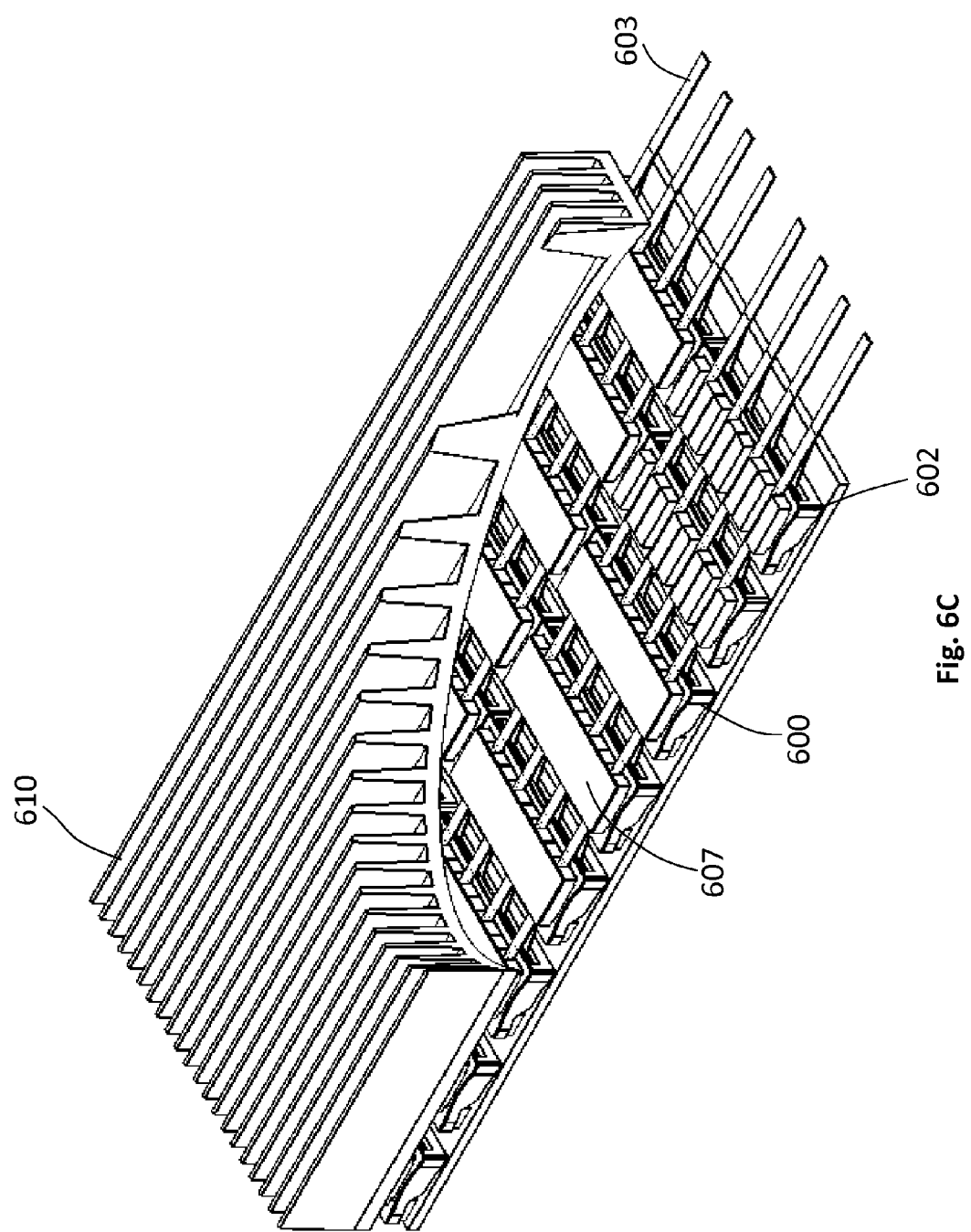
FIGS. 6C and 6D are front perspective, cutaway views of the array shown in FIG. 6A.
Figure 6D:
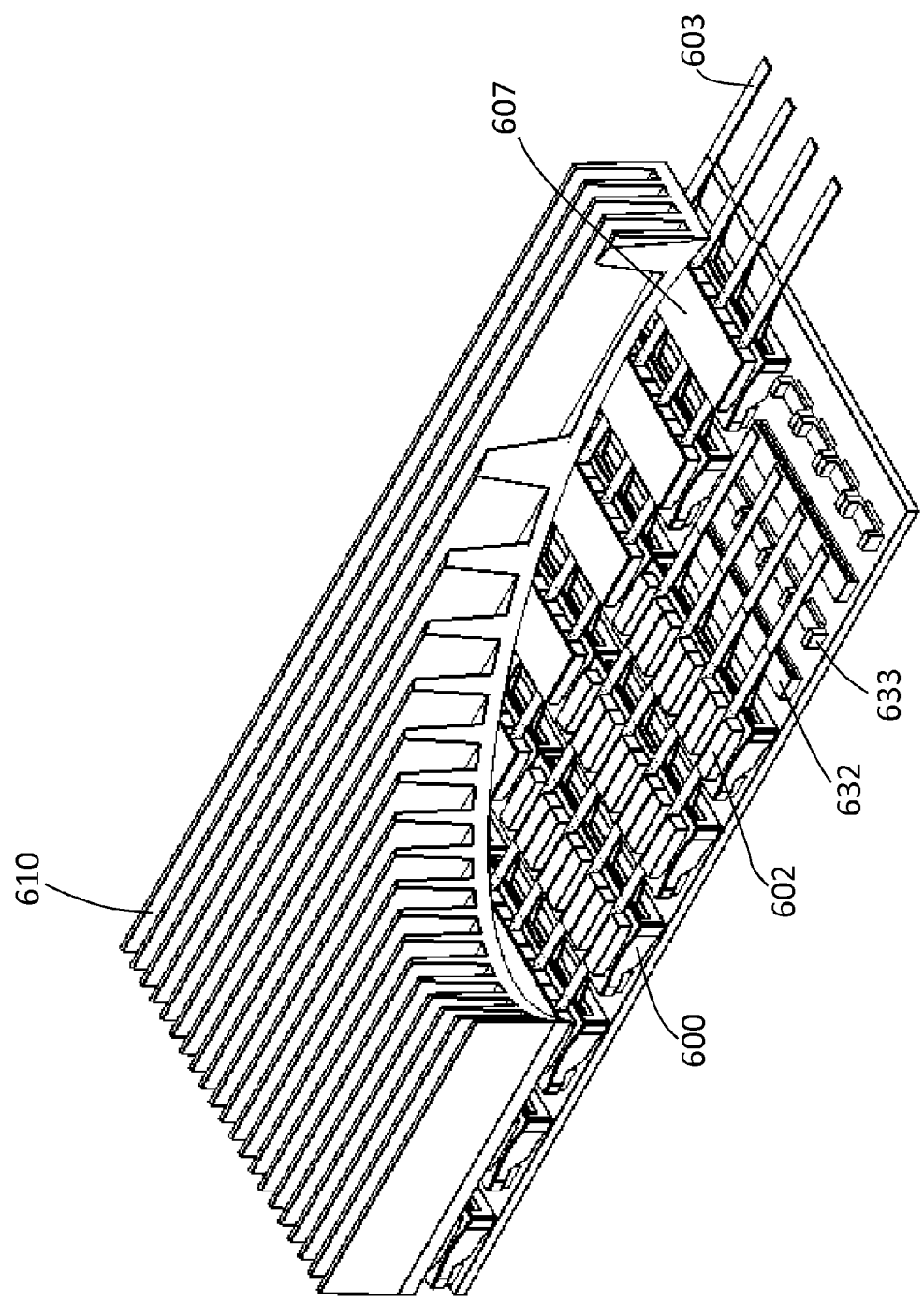

FIGS. 6A-6D shows a second preferred embodiment of the present invention. Connector assemblies such as those of the various other preferred embodiments can be arranged in any desired configuration and/or for any desired function. For example, in FIGS. 6A-6C, sixteen 1×4 cradles 600 are arranged in eight rows with two cradles 600 per row. The cradles are preferably connected to a heatsink 610. Heatsink 610 is preferably connected to the heatsinks (not labeled in FIGS. 6A-6D) of each of the connectors 602 by thermal material 607. A portion of the heatsink 610 is cutaway to show the cradles 600 underneath the heatsink 610. In FIG. 6C, thermal material 607 is not shown for two cradles 600 so that the arrangement of the cables 603 can be seen. The cables 603 of adjacent rows are located in the grooves (not labeled in FIGS. 6A-6D) in the connectors 602. In FIG. 6D, two of the cradles 600 are removed to show the rows of first and second receptacles 632 and 633.

If the connectors 602 are FireFly™ optical transceivers, then this array of sixteen cradles 600 provides 768 channels (=12 channels per FireFly™ optical transceivers×4 FireFly™ optical transceivers per cradle×16 cradles).

Figure 7C:
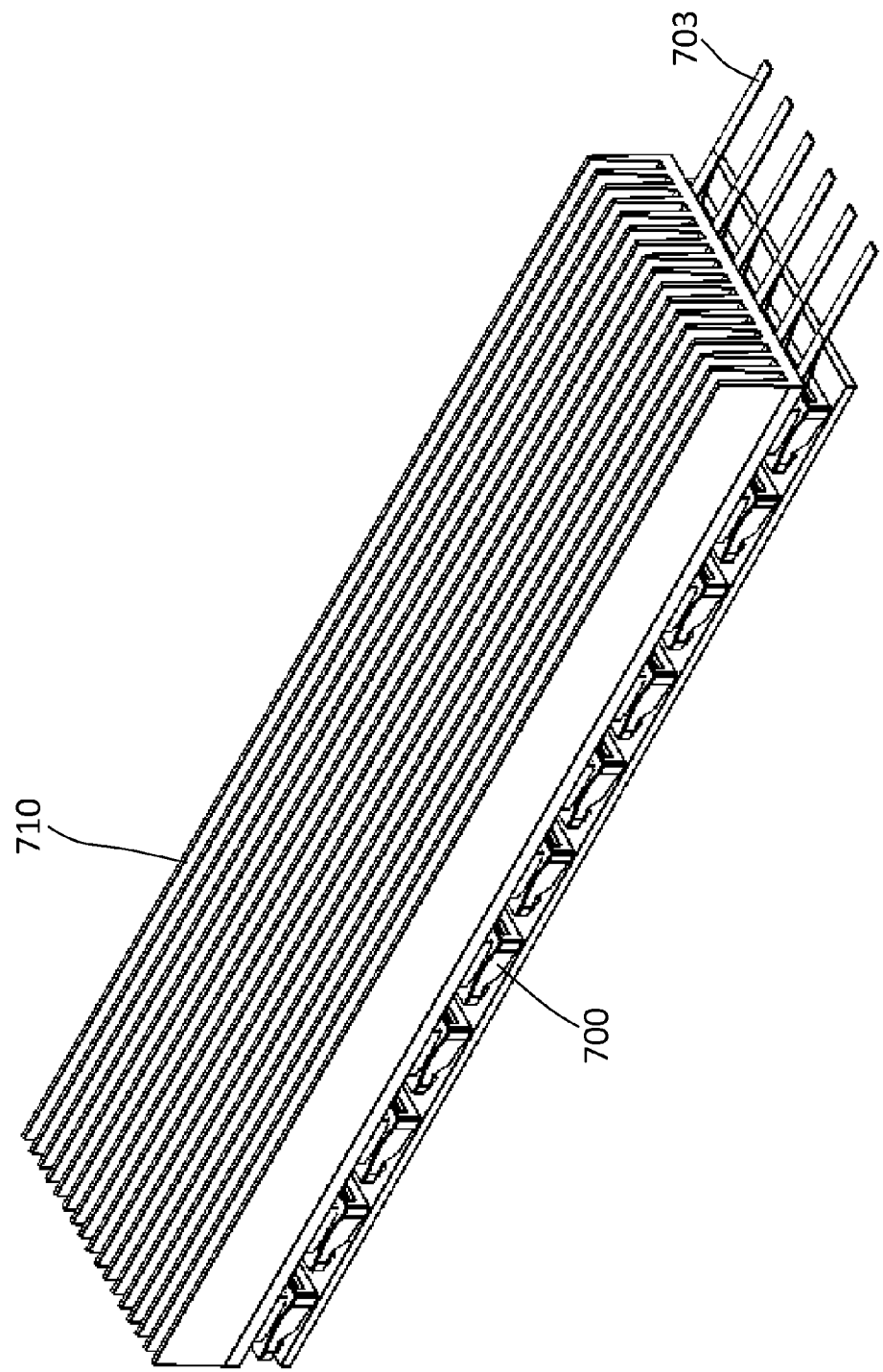
FIG. 7C is a front perspective view of the array shown in FIG. 7A.

FIGS. 7A-7C show a third preferred embodiment of the present invention in which 1×6 cradles 700, i.e. each cradle 700 includes six connectors 702, are arranged in eleven rows with a single array per row. A heatsink 710 is preferably connected to the cradles 700. Cables 703 are preferably arranged in a similar manner as the cables 603 in FIGS. 6A-6D.

If the connectors 702 are FireFly™ optical transceivers, then this array of eleven cradles 700 provides 792 channels (=12 channels per FireFly™ optical transceivers×6 FireFly™ optical transceivers per cradle×11 cradles).

Figure 8C:
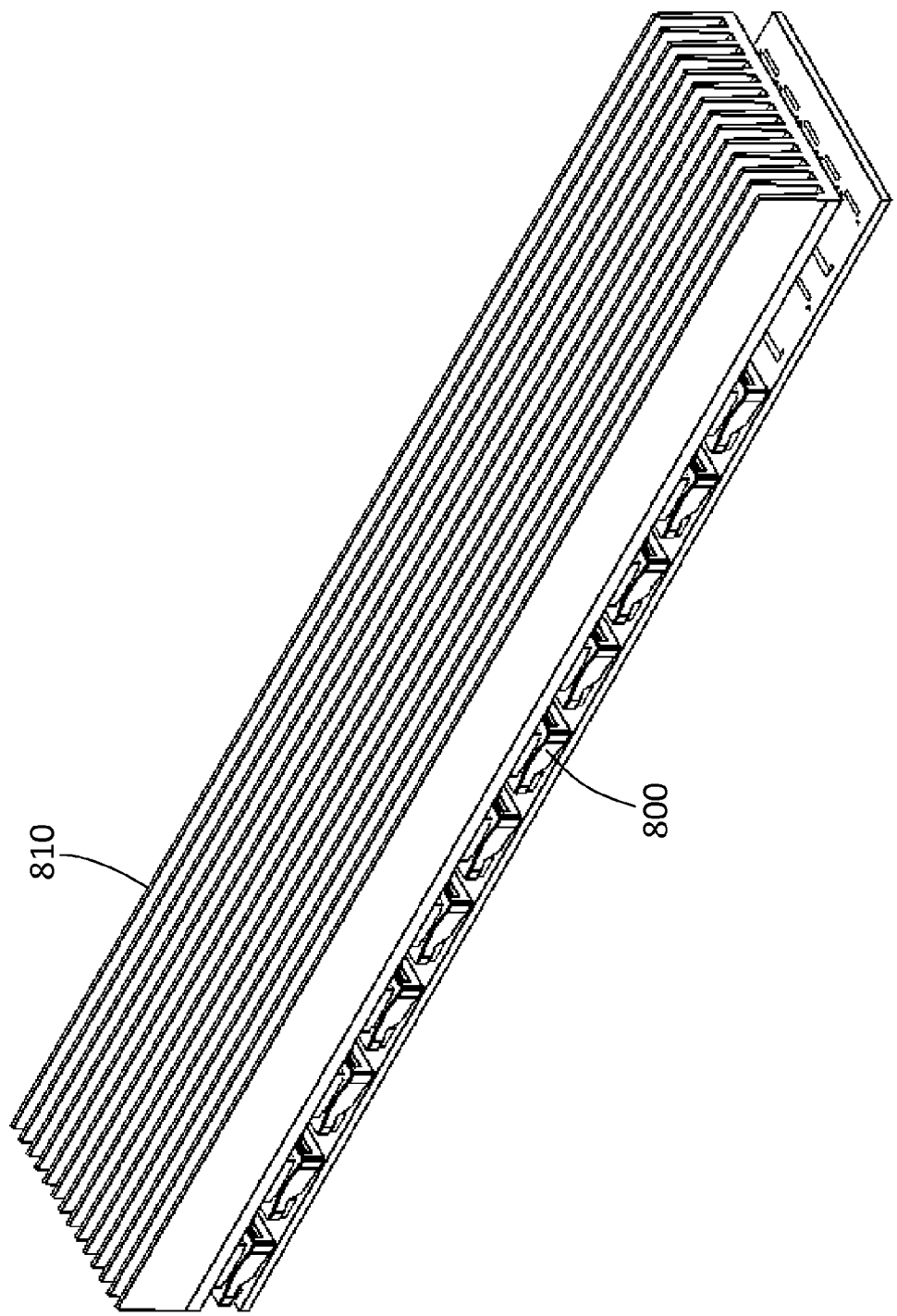
FIG. 8C is a front perspective view of the array shown in FIG. 8A.

FIGS. 8A-8C show a fourth preferred embodiment of the present invention in which 1×5 cradles 800, i.e. each cradle 800 includes five connectors 802, are arranged in thirteen rows with a single array per row. Two of the cradles 800 are not shown in FIGS. 8A-8C. A heatsink 810 is preferably connected to the cradles 800. Cables 803 are preferably arranged in a similar manner as the cables 603 in FIGS. 6A-6D and the cables 703 in FIGS. 7A-7C.

If the connectors 802 are FireFly™ optical transceivers, then this array of thirteen cradles 800 provides 780 channels (=12 channels per FireFly™ optical transceivers×5 FireFly™ optical transceivers per cradle×13 cradles).

FIGS. 11-24B show a fifth preferred embodiment of the present invention. The connector assembly shown in FIGS. 19 and 20 includes a cradle 200 and connectors 202. The connector assembly of the fifth preferred embodiment can also be used with the substrate 130 shown in FIGS. 9 and 10. The cradle 200 and the connector 202 are similar to the cradle 100 and the connector 102. Cradle 200 includes an opening 201 for receiving the connectors 202. Cradle 200 also includes a base 207, a lever 211, and a dowel rod 209.

Figure 11:
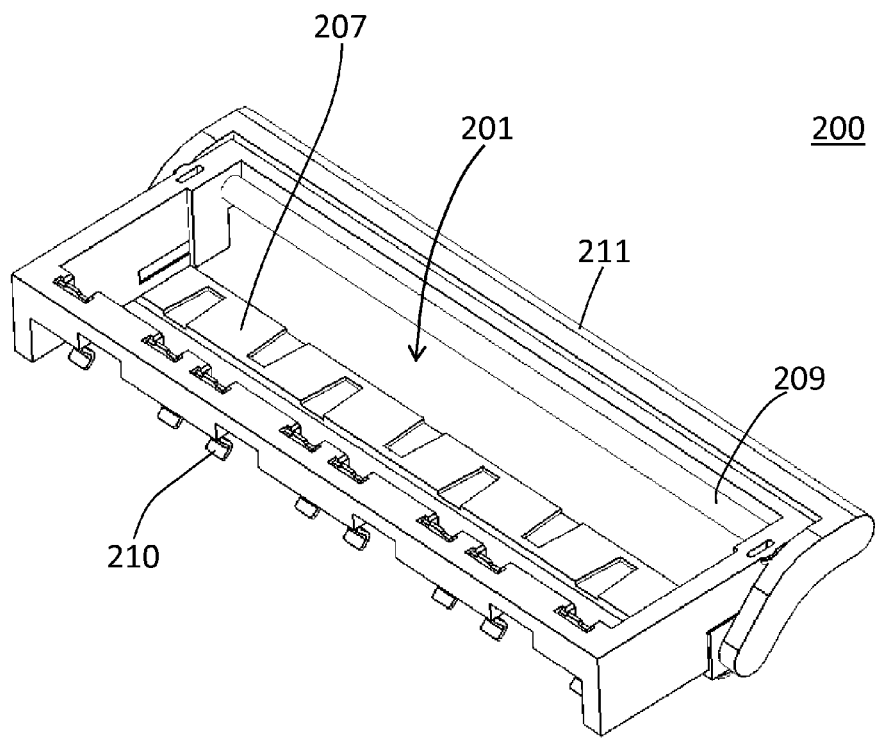
FIGS. 11 and 12 are front perspective views of a cradle according to a fifth preferred embodiment of the present invention.
Figure 12:
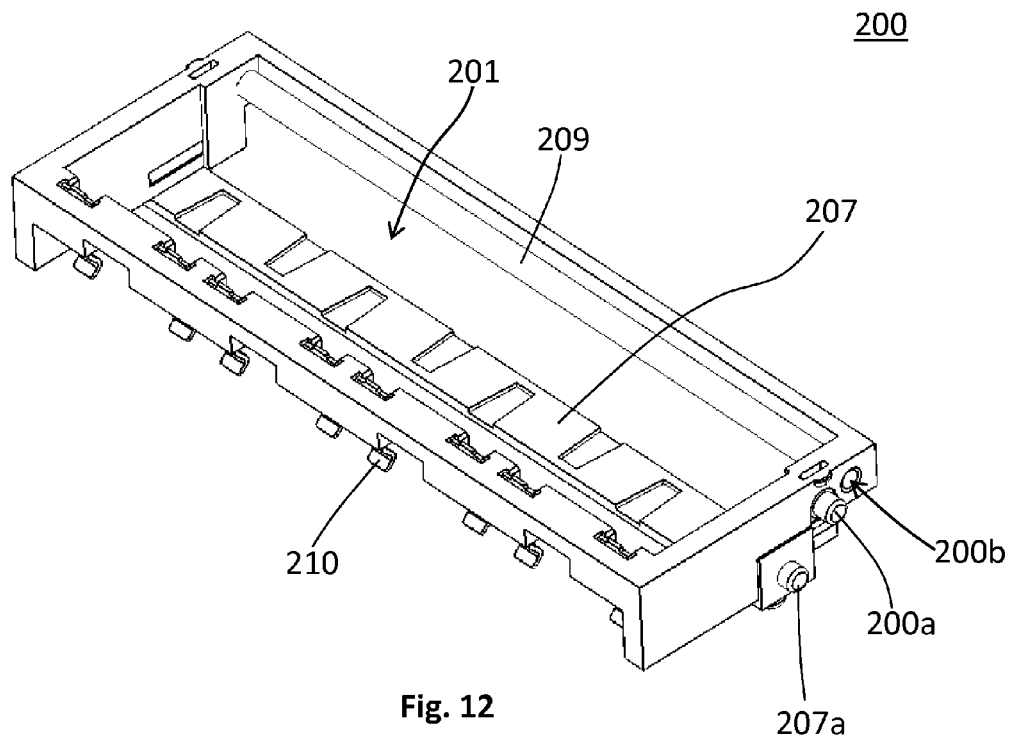
Figure 13:
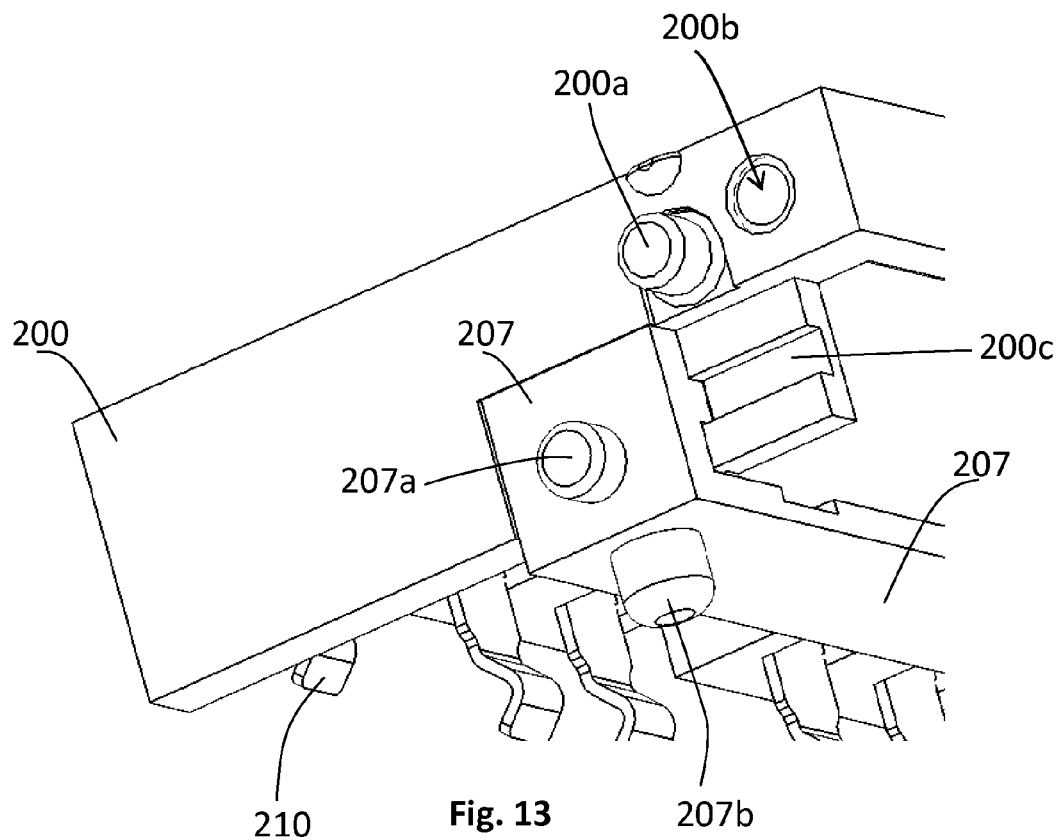
FIGS. 13 and 14 are close-up views of the cradle shown in FIG. 11.
Figure 14:
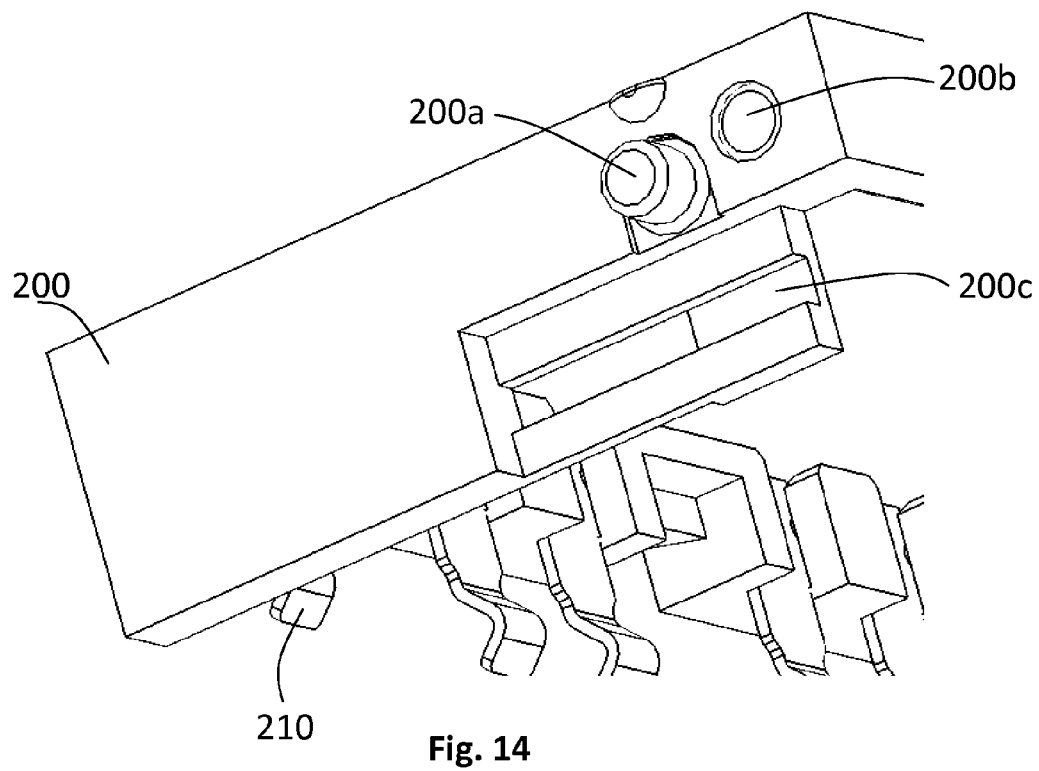
Figure 15:
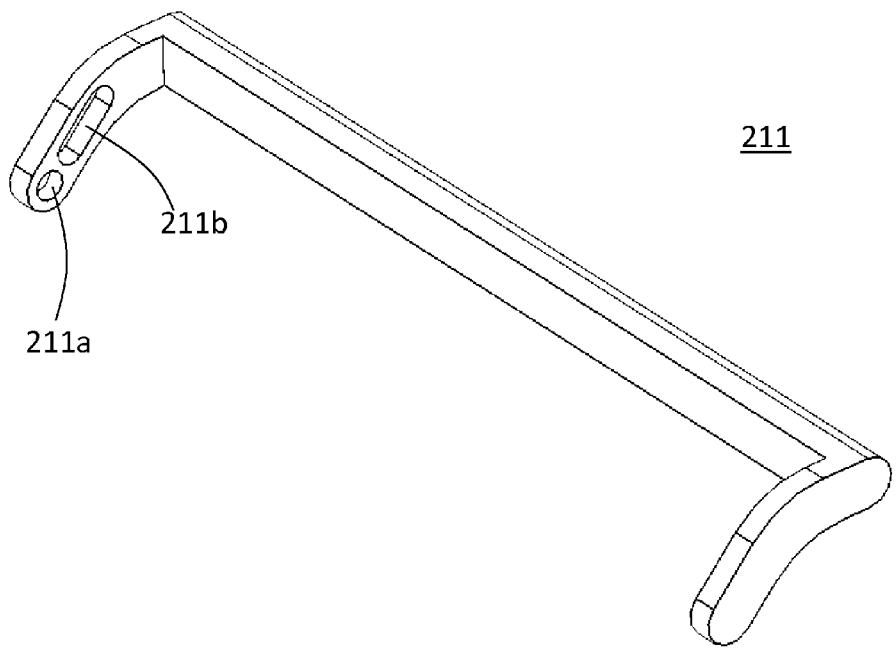
FIG. 15 is a front perspective view of a lever used with the cradle shown in FIG. 11.
Figure 16:
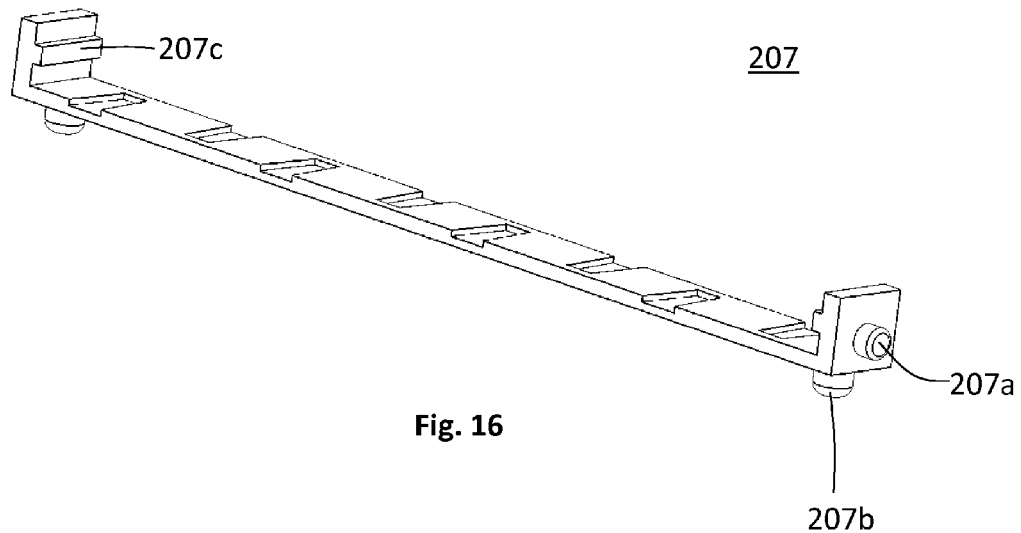
FIG. 16 is a front perspective view of a base used with the cradle shown in FIG. 11.

The base 207 and the lever 211 are used to seat the connectors 202 with the corresponding first and second receptacles 132, 133 as shown in FIGS. 22A-24B. The base 207 and the lever 211 make it possible to use second receptacles 132 without positive latching because the base 207 and the lever 211 provide external positive latching. FIG. 11 shows the cradle 200 with the base 207 and the lever 211. FIG. 12 shows the cradle 200 without the lever 211. FIG. 13 is a close-up view of the cradle 200 with the base 207 but without the lever 211, and FIG. 14 is a close-up view of the cradle 200 without the base 207 and without the lever 211. FIG. 15 shows the lever 211 by itself, and FIG. 16 shows the base 207 by itself.

The base 207 includes pegs 207a, 207b and tongue 207c. The lever 211 includes holes 211a and grooves 211b. The pegs 207a of the base 207 are inserted into the holes 211a of the lever 211 to allow the lever 211 to be rotated about the pegs 207a. The pegs 207b of the base 207 are located on the bottom of the base 207 and are inserted into holes 131 in the substrate 130 to fix the base 207 with respect to the first and second receptacles 132, 133. The tongue 207c engages with the groove 200c in the cradle 200 to allow the cradle 200 to be moved linearly with respect to the base 207. The grooves 211b of the lever 211 engage with pegs 200a on the cradle 200. Rotating the lever 211 about the pegs 207a causes the pegs 200a to slide along the groove 211b to allow the cradle 200 to be moved linearly with respect to the base 207.

The dowel rod 209 is similar to the ledge 109 in that both are used to secure the connectors 202 in the cradle 200. After the connectors 202 are placed in the cradle 200, the dowel rod 209 is inserted into a hole 200b in the cradle 200 to engage the grooves 208 in the connector 202 as seen in FIG. 17.

Springs 210 are located along one edge of the opening 201. Springs 210 are similar to the spring 110 in accommodating variances in the x-, y-, and z-dimensions. Cradle 200 does not to need to be precisely aligned because the springs 210 allow each connector 202 to self-align relative to the first and second receptacles 132, 133.

Figure 17:
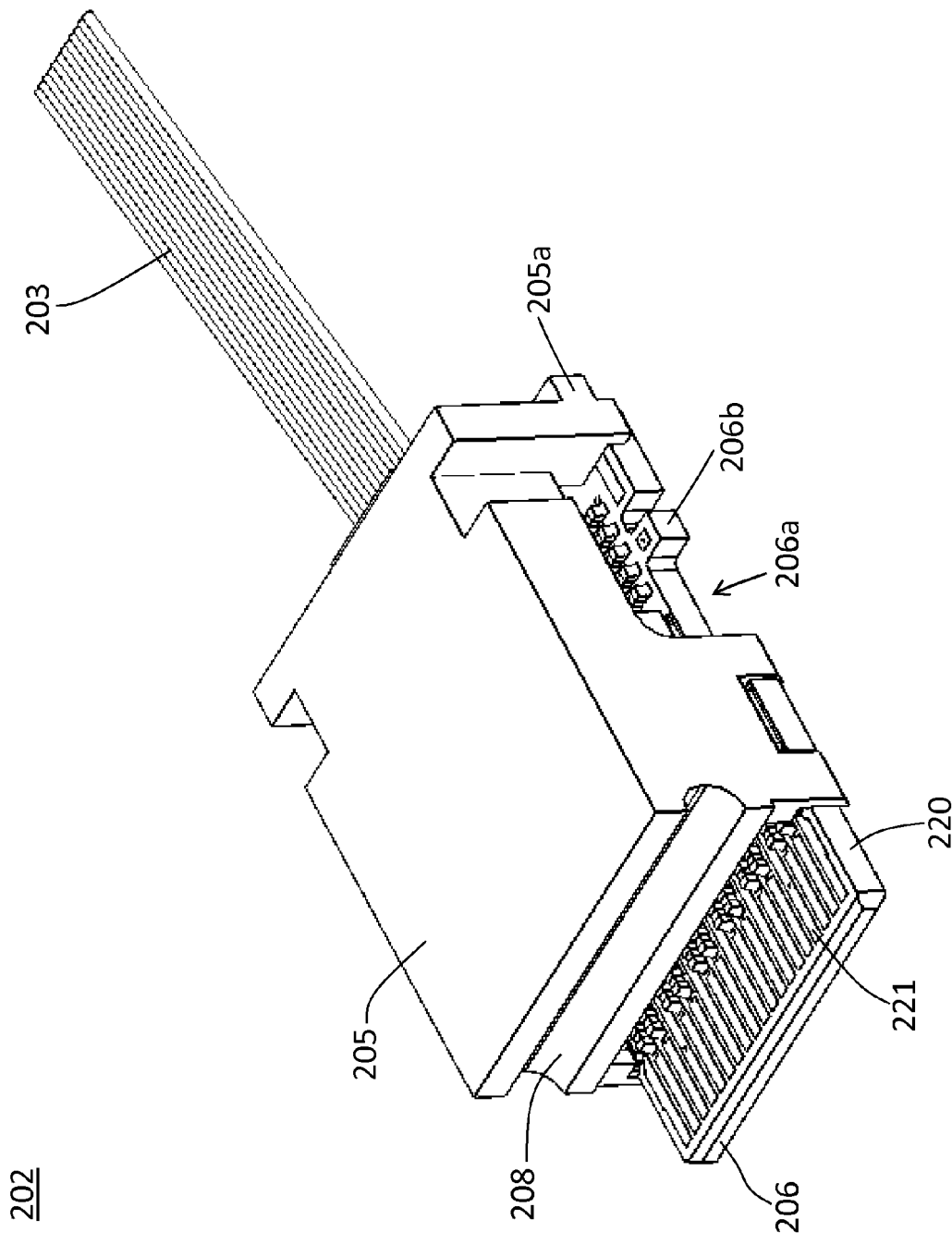
FIGS. 17 and 18 are front and rear perspective views of a connector that can be used with the cradle shown in FIG. 11.
Figure 18:
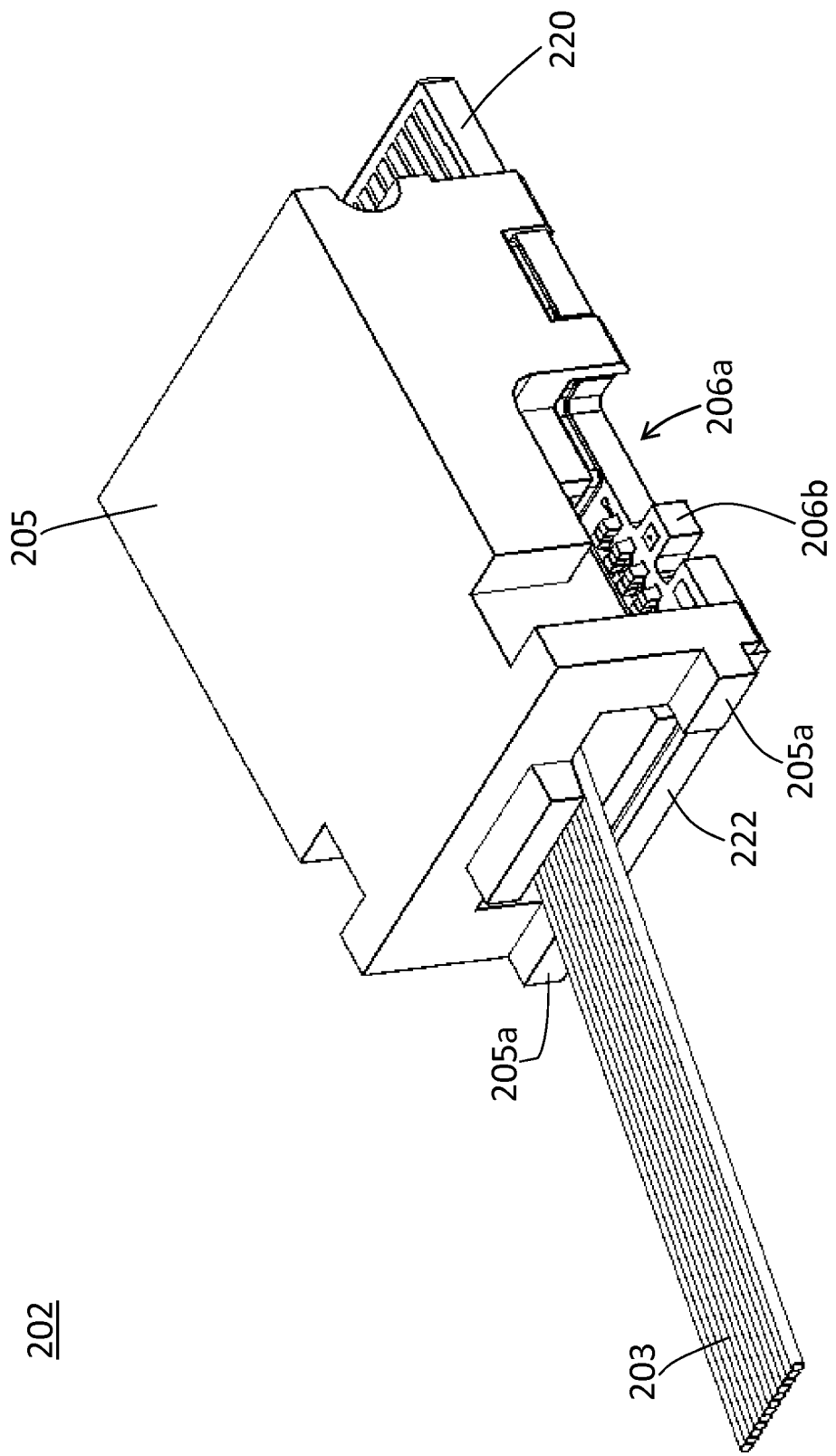

FIGS. 17 and 18 show the connector 202. The connector 202 is similar to the connector 102 except that the heatsink 205 of the connector 202 is different from the heatsink 105 of the connector 102. The connector 202 is connected to a cable 203. The connector 202 can also be a FireFly™ optical transceiver, with difference being the heatsink. Although the heatsink 205 is not shown with a groove such as groove 107 in connector 102, the heatsink 205 can include such a groove to help with cable management. The heatsink 205 is attached to board 206. The board 206 includes notch 206a and portion 206b that are similar to the notch 106a and portion 106b in board 106. The board 206 includes pads 221 on end 220. The pads 221 are preferably located on the top and bottom of the board 206. The other end 222 of the board 206 includes pads (not shown) on the bottom of the board 206. The heatsink 205 includes blocks 205a that engage with springs 210.

Figure 19:
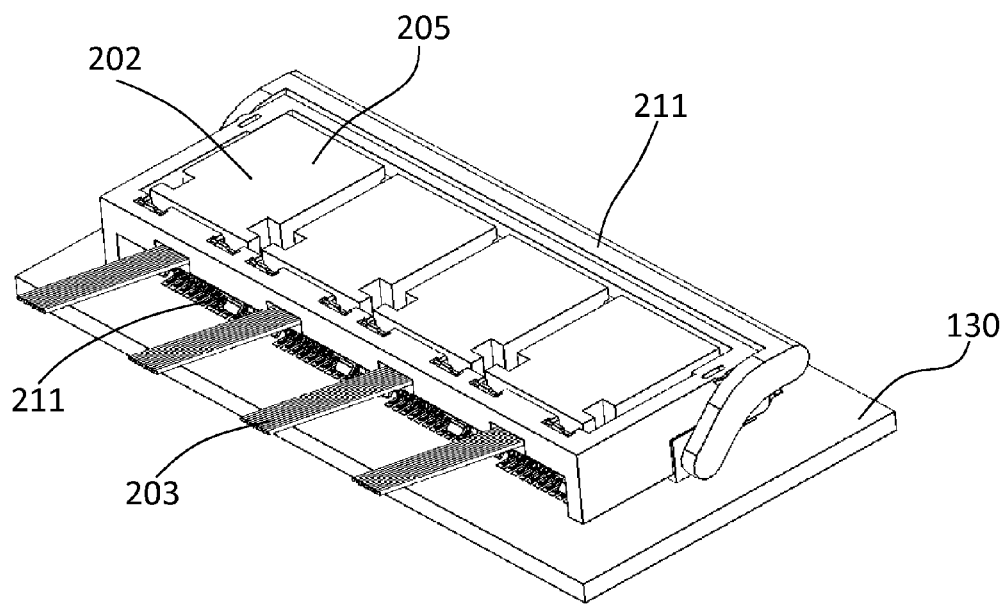
FIGS. 19 and 20 are front and rear perspective views of a connector assembly according to a fifth preferred embodiment of the present invention.
Figure 20:
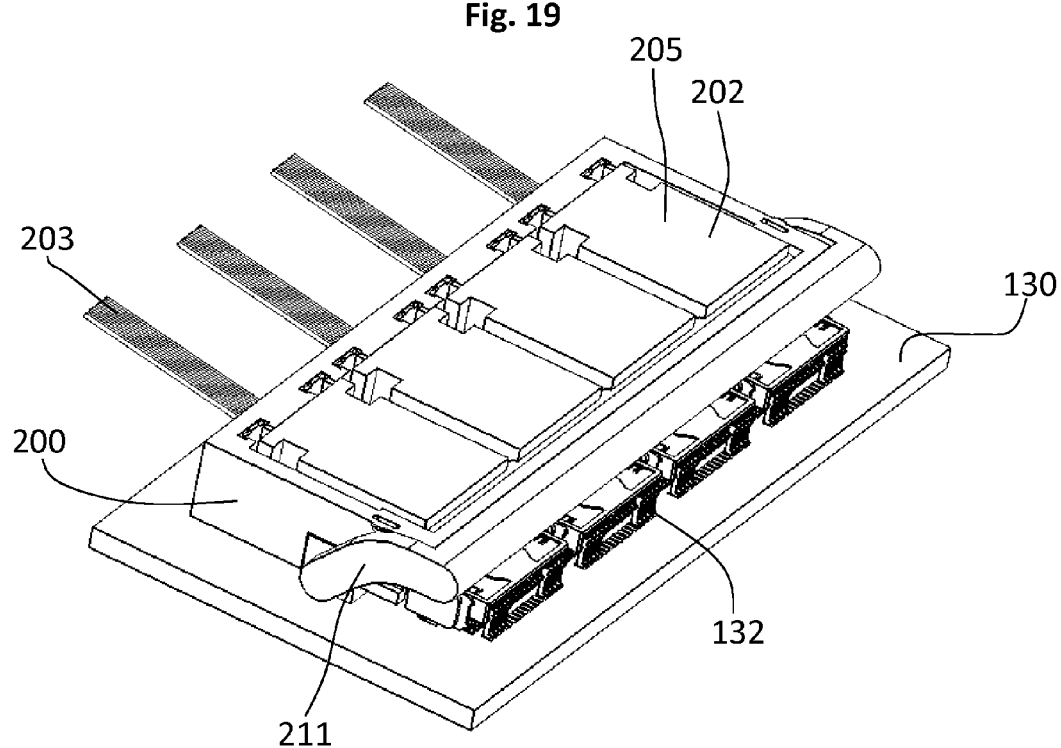

FIGS. 19 and 20 show the connector assembly when the connectors 202 are seated with the receptacles 132, 133. FIG. 21 shows a cross section of when the connectors 202 are seated with the receptacles 132, 133. FIG. 21 shows the contacts 132c of the first receptacle 132 contacting the top and bottom of the board 206 and the contacts 133c of the second receptacle 133 contacting the bottom of the board 206. FIG. 21 also shows the optical engine 235 on the board 206. The optical engine 235 can provide electrical-to-optical conversion, optical-to-electrical conversion, or both.

Figure 24A:
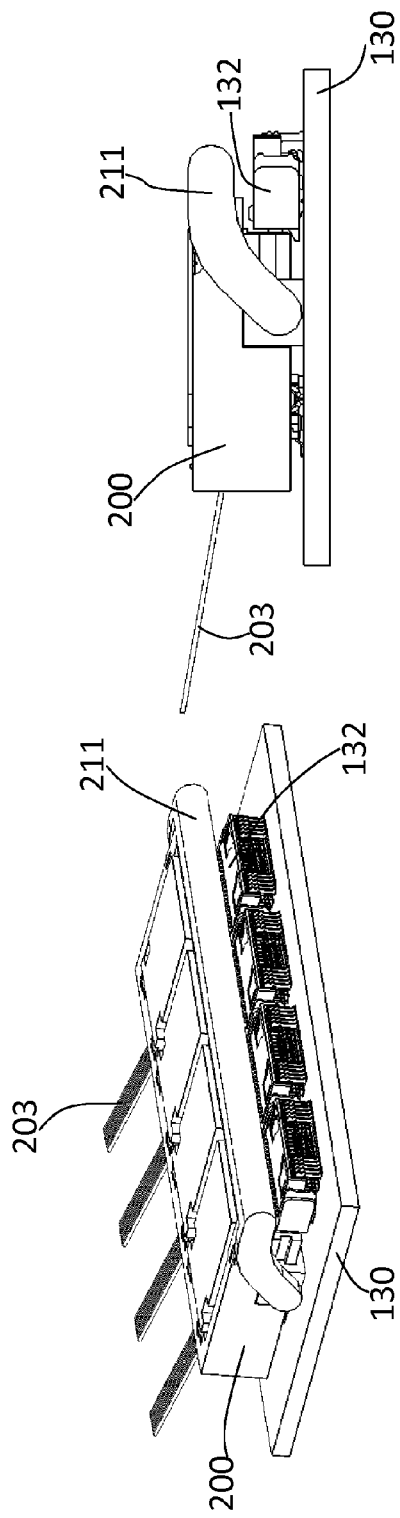
Figure 24B:
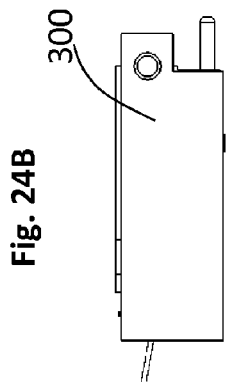
Figure 25A:
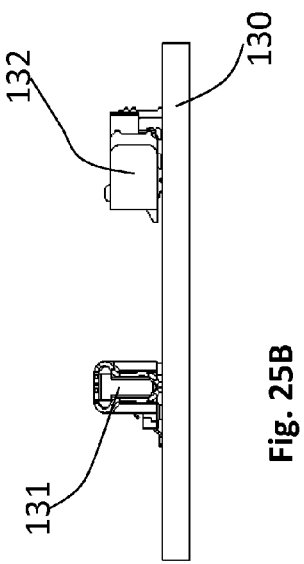
Figure 25B:
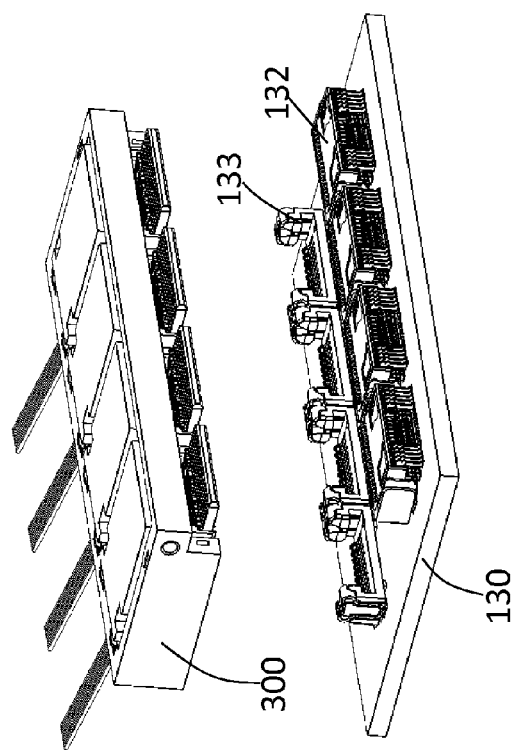

FIGS. 22A-24B show the connector assembly being seated with positive external latching provided by the base 207 and the lever 211. In one example, preferably, four connectors 102 are inserted into the cradle 200, for example. FIGS. 22A and 22B show the cradle 200 after the connectors 102 have been inserted and before the cradle 200 is loaded onto the board 206. In FIGS. 23A and 23B, the pegs 207b of the base 207 are inserted into the holes 131 of the substrate, and the notches 206a of the board 206 are fitted over the pillars 133a of the second receptacle 133. In FIGS. 24A and 24B, the lever 211 is rotated to seat the connectors 202 by sliding the cradle 200 towards the first receptacle 132 such that the portion 206b of the board 106 is inserted into the slot 133b of the second receptacle 133 and such that the end 220 of the board 206 is inserted into the first receptacle 132.

FIGS. 25A-27B show a connector assembly according to a sixth preferred embodiment of the present invention being seated. This connector assembly can be seated without providing external positive latching. The connector assembly shown in FIGS. 25A-27B includes a cradle 300. The cradle 300 is similar to the cradle 200 except that cradle 300 does not include a lever 211. The cradle 300 is seated in a similar manner; however, the cradle 300 is not seated by moving a lever. The cradle 300 can be seated, after being loaded as cradle 200, by sliding the cradle 300 towards the second receptacle 300. The cradle 300 can be slid by a person or any other suitable device.

FIGS. 28-32 show a connector assembly according to a seventh preferred embodiment of the present invention. The connector assembly includes a cradle 400. The cradle 400 and the connector 402 are similar to cradle 100, 200 and connector 102, 202. Cradle 400 is similar to cradle 200. Cradle 400 includes an opening 401 for receiving the connectors 402. Cradle 200 includes a lever 411 that extends from the middle of the cradle 400 instead of extending along one edge of the cradle 200 as lever 211 does. The lever 411 makes it possible to use second receptacles 132 without positive latching because the lever 411 provides external positive latching.

Figure 33:
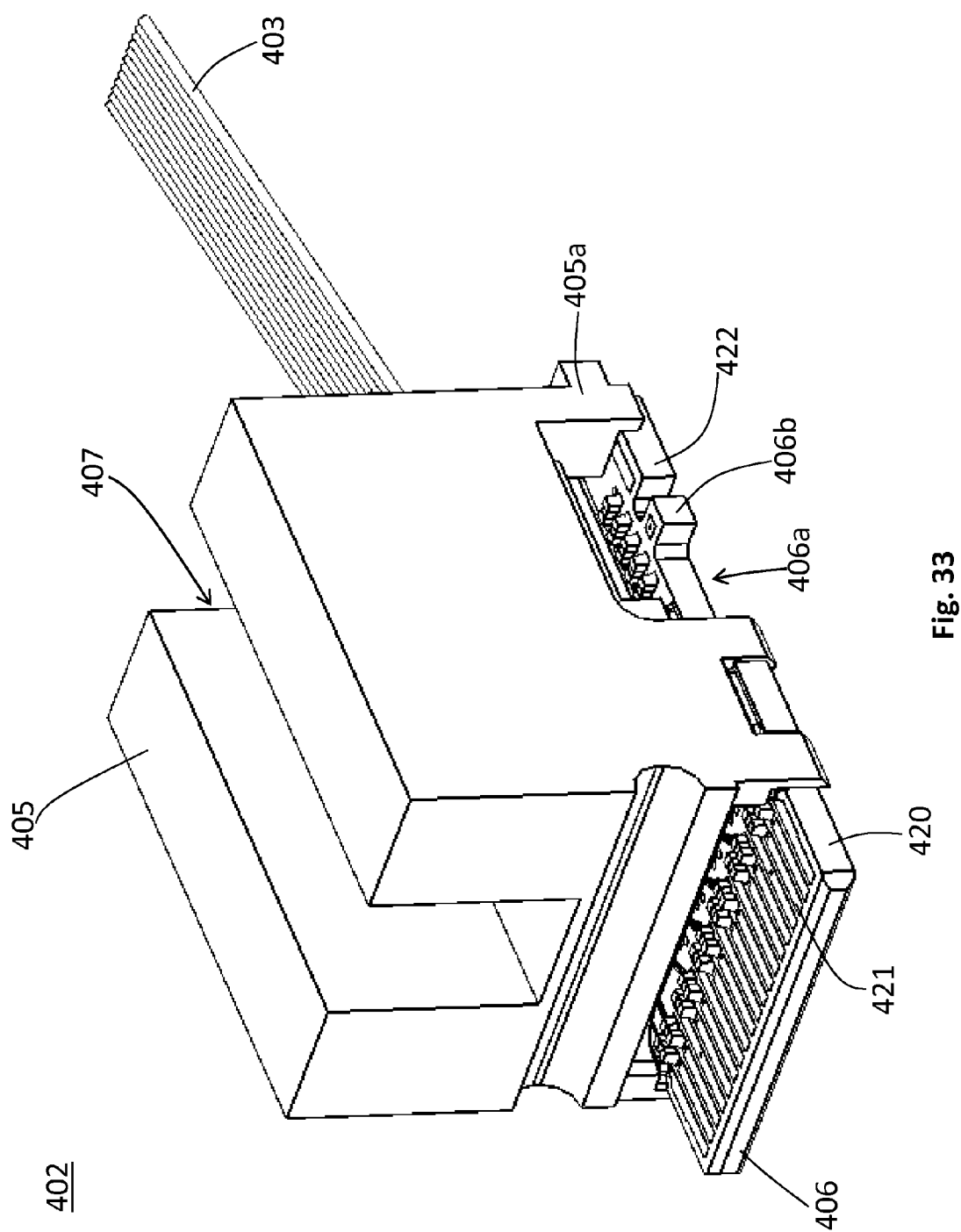

FIGS. 33 and 34 show the connector 402. The connector 402 is connected to a cable 403. The connector 402 can also be a FireFly™ optical transceiver, with difference being the heatsink. Heatsink 405 is shown with a groove 407; however, groove 407 can be omitted in applications in which cable management is not a concern. The heatsink 405 is attached to board 406. The board 406 includes notch 406a and portion 406b that are similar to notches 106a, 206a and portions 106b, 206b in boards 106, 206. The board 406 includes pads 421 on end 420. The pads 421 are preferably located on the top and bottom of the board 406. The other end 422 of the board 406 includes pads (not shown) on the bottom of the board 406. The heatsink 205 includes blocks 205a that engage with springs 410.

Figure 32:
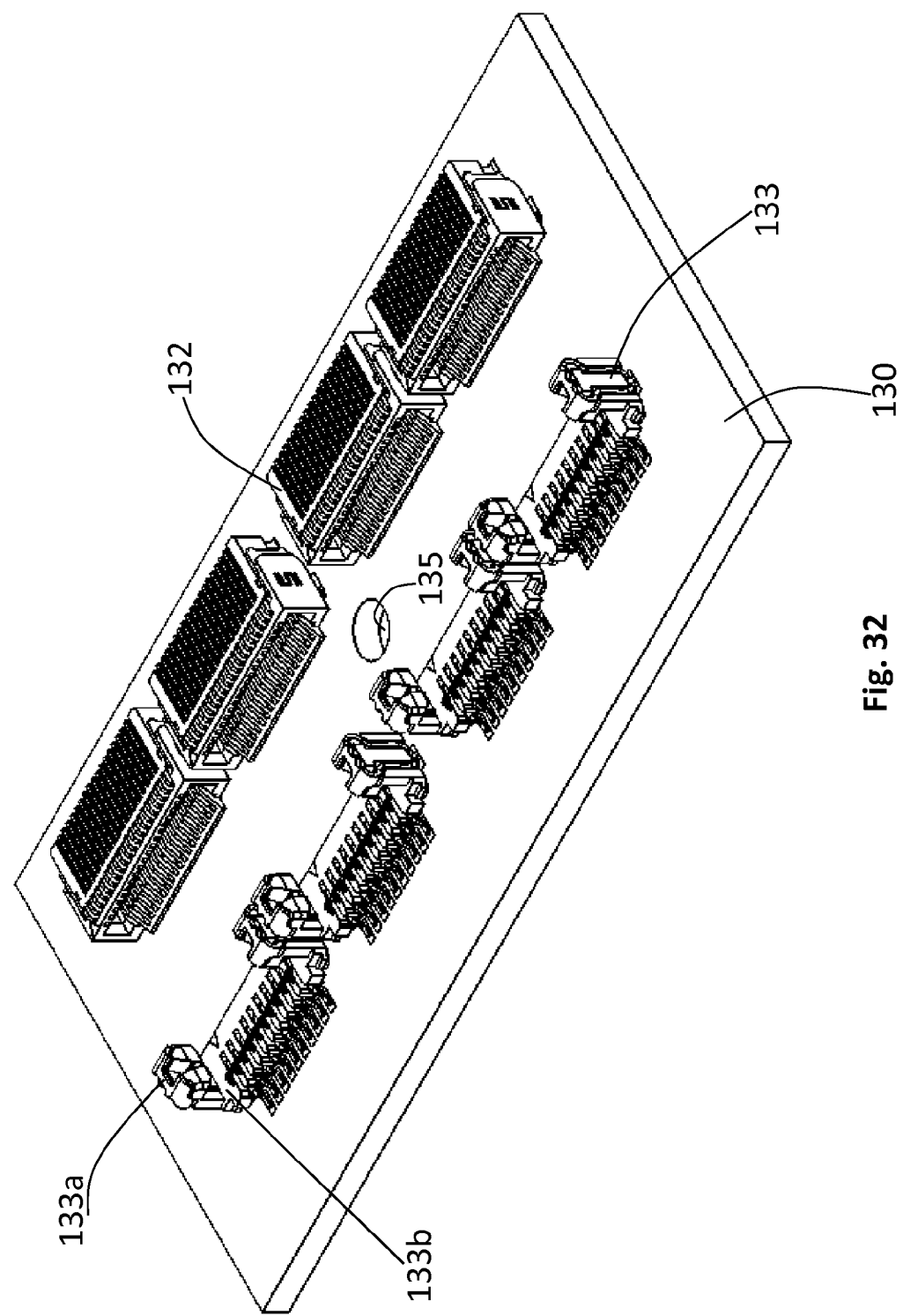
FIG. 32 is a perspective view of a PCB that can be used with the seventh preferred embodiment of the present invention.

FIG. 32 shows the substrate 130. The substrate 130 include first and second receptacles 132, 133. The substrate 130 in FIG. 32 is similar to the substrate in FIG. 10 except that the substrate 130 in FIG. 32 includes a hole 135 in the middle of the row of first and second receptacles 132, 133. The ball 411a of the lever 411 is inserted into the hole 135.

Figure 28:
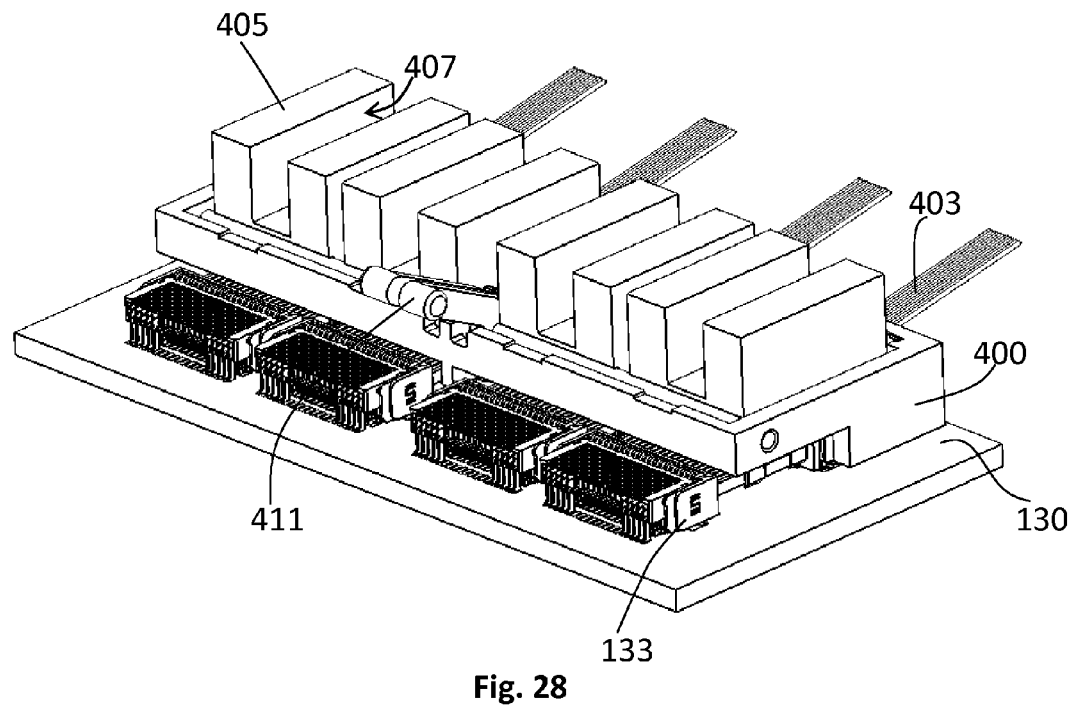
FIGS. 28-31 are perspective and side sectional views of a connector assembly according to a seventh preferred embodiment of the present invention being seated.
Figure 29:
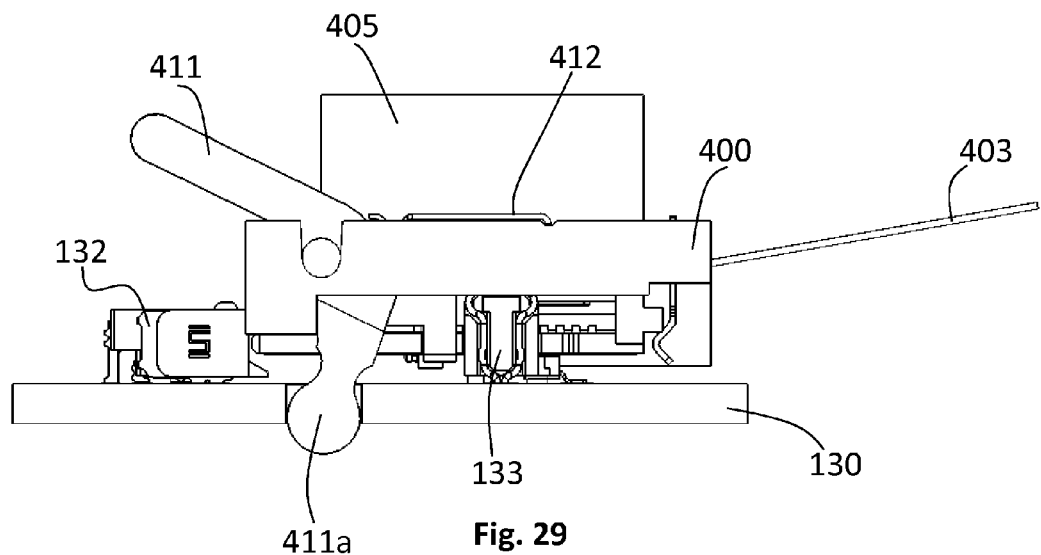
Figure 30:
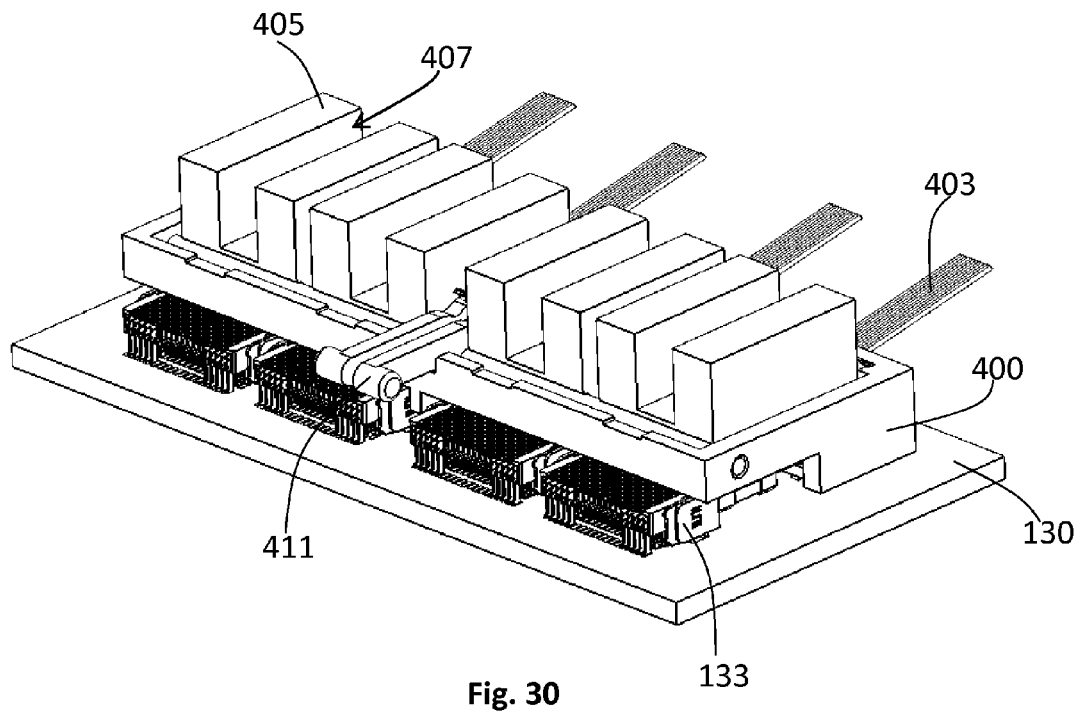
Figure 31:
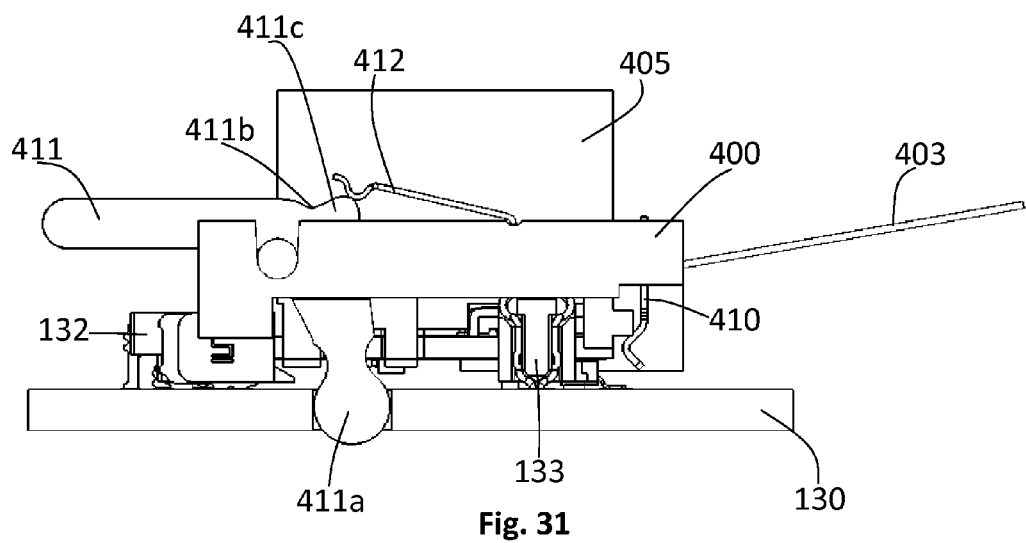

FIGS. 28-31 show the connector assembly being seated, which is similar to the seating methods shown in FIGS. 22A-27B. FIGS. 28 and 29 show a loaded cradle 400 before it is seated. An end of the spring 412 rests in a notch 411b in the lever 411 to fix the orientation of the lever 411. The ball 411a of lever 411 is engaged with hole 135 in the substrate 130 to allow the lever 411 to be rotated about the ball 411a. In FIGS. 30 and 31, the lever 411 is rotated to seat the connectors 402 by sliding the cradle 400 towards the first receptacle 132 such that the portion 406b of the board 406 is inserted into the slot 133b of the second receptacle 133 and such that the end 420 of the board 406 is inserted into the first receptacle 132. The spring 412 engages the corner 411c of the lever 411 to fix the orientation of the lever 411.

The connector assemblies of preferred embodiments of the present invention provide transfer rates of up to 28 Gbps because each channel includes a single radio frequency (RF) connector between the substrate and the optical engine, and multiple data lanes can go through the same physical receptacle so that the subsystem is easily upgradable to 28 Gbps when the optical modules are available. The module assembly also maximizes system design flexibility because multiple subsystems aggregating different numbers of modules can easily be designed and produced to fit customer needs, and subsystems can include any combinations of transmit and receive connectors.

The connector assemblies of preferred embodiments of the present invention also decrease the number of individual modules to be manipulated because a single cradle can hold multiple connectors, and different cradles can be used to aggregate different numbers of connectors or to aggregate the same number of connectors but in different configurations (e.g., 1×4, 2×2, etc.). Additionally, the connector assembly reduces logistics complexity because families of subsystems make use of the same connector (e.g., FireFly™ optical transceiver) regardless of their channel counts, thereby allowing for lower amounts of inventory as the same standard connector can be used in many different subsystems. Also, the lead-time necessary to build a subsystem is relatively short because the system is made of pre-built and pre-tested connectors. The module assembly also enables maintaining of a high manufacturing yield because subsystems are quickly built from a set of standard components (e.g., cradles and connectors). Each connector is built and tested separately before it is installed in the subsystem, and subsystems can easily be reworked if a connector fails by just changing the failed module.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A system comprising:
a substrate including a first row of first receptacles;
a cradle including an opening and a spring member;
connectors located within the opening; and
cables connected to the connectors; wherein
the cradle is configured to connect each of the connectors simultaneously or nearly simultaneously to a corresponding first receptacle; and
the spring member pushes on each of the connectors with a force greater than an insertion force of the corresponding first receptacle.

2. A system of claim 1, wherein the cables are optical fibers.

3. A system of claim 1, further comprising a lever configured to move a portion of the cradle to cause each of the connectors to simultaneously or nearly simultaneously be connected to the corresponding first receptacles.

4. A system of claim 3, wherein the lever extends along an edge of the cradle.

5. A system of claim 3, wherein the lever extends from the opening.

6. A system of claim 1, wherein there are three or more connectors within the cradle.

7. A system of claim 1, wherein the first row of first receptacles is located in a middle of the substrate.

8. A system of claim 1, wherein the connectors are located side-by-side.

9. A system of claim 1, wherein:
the substrate further includes a second row of second receptacles; and
the cradle is configured to connect each of the connectors simultaneously or nearly simultaneously to a corresponding second receptacle.

10. A system of claim 9, wherein the second receptacles are positive latch connectors.

11. A system of claim 1, wherein:
the cradle includes grooves corresponding to each of the connectors;
each of the connectors includes a groove; and
each of the grooves in the cradle is aligned with a groove in a corresponding connector.

12. A system of claim 1, wherein the first receptacles are edge-card connectors.

13. A system of claim 1, further including a rod inserted through holes in the cradle to secure the connectors in the cradle.

14. A system of claim 1, wherein the cradle includes a base with pins that engage with holes in the substrate.

15. A system of claim 1, wherein each of the connectors includes a groove configured to secure each of the connectors in the cradle.

16. A system comprising:
a substrate including a first row of first mid-board receptacles and a second row of second mid-board receptacles;
a cradle including an opening;
connectors located within the opening; and
cables connected to the connectors; wherein
the cradle is configured to connect each of the connectors simultaneously or nearly simultaneously both to the corresponding first mid-board receptacle and to a corresponding second mid-board receptacle.

* * * * *